US008572161B2

(12) United States Patent
Gill

(10) Patent No.: US 8,572,161 B2
(45) Date of Patent: Oct. 29, 2013

(54) SIMPLIFYING SYNCHRONIZATION OF COPIES OF SAME DATA USED BY MULTIPLE APPLICATIONS

(75) Inventor: Bikram Singh Gill, Mohali (IN)

(73) Assignee: Oracle International Corporation, Redwood Shores, CA (US)

( * ) Notice: Subject to any disclaimer, the term of this patent is extended or adjusted under 35 U.S.C. 154(b) by 1250 days.

(21) Appl. No.: 12/046,504

(22) Filed: Mar. 12, 2008

(65) Prior Publication Data

US 2009/0235185 A1 Sep. 17, 2009

(51) Int. Cl.
*G06F 15/16* (2006.01)

(52) U.S. Cl.
USPC ........... 709/203; 707/602; 707/635; 707/805; 707/809; 707/812

(58) Field of Classification Search
USPC ......... 709/201–203, 208–209, 218–220, 248; 707/614–615, 626–633, 634, 637, 707/662–665, 690–692, 702–703, 707/806–811; 715/230, 234, 700, 735–739, 715/748, 760, 866
See application file for complete search history.

(56) References Cited

U.S. PATENT DOCUMENTS

| 6,012,067 | A * | 1/2000 | Sarkar | 1/1 |
| 6,393,434 | B1 * | 5/2002 | Huang et al. | 1/1 |
| 7,143,094 | B2 * | 11/2006 | Arroyo et al. | 1/1 |
| 7,225,411 | B1 * | 5/2007 | Stoner et al. | 715/760 |
| 7,487,191 | B2 * | 2/2009 | Castro et al. | 1/1 |
| 7,516,167 | B2 * | 4/2009 | Selman et al. | 1/1 |
| 7,546,335 | B2 * | 6/2009 | Moeller et al. | 709/201 |
| 7,584,197 | B2 * | 9/2009 | Dant | 1/1 |
| 7,752,255 | B2 * | 7/2010 | Cohen et al. | 709/202 |
| 7,761,406 | B2 * | 7/2010 | Harken | 707/602 |
| 7,761,480 | B2 * | 7/2010 | Toledano et al. | 707/804 |
| 7,765,281 | B1 * | 7/2010 | Crow et al. | 709/219 |
| 7,949,720 | B2 * | 5/2011 | Vernal et al. | 709/207 |
| 8,041,760 | B2 * | 10/2011 | Mamou et al. | 709/206 |
| 8,046,383 | B2 * | 10/2011 | Weber et al. | 707/802 |
| 8,060,553 | B2 * | 11/2011 | Mamou et al. | 709/203 |
| 8,121,976 | B2 * | 2/2012 | Kalia et al. | 707/601 |
| 8,307,109 | B2 * | 11/2012 | Mamou et al. | 709/232 |
| 2004/0054711 | A1 * | 3/2004 | Multer | 709/201 |
| 2006/0107251 | A1 * | 5/2006 | Boshier et al. | 717/108 |
| 2008/0208806 | A1 * | 8/2008 | Dalfo et al. | 707/3 |
| 2009/0037523 | A1 * | 2/2009 | Kolke et al. | 709/203 |
| 2009/0083441 | A1 * | 3/2009 | Clark et al. | 709/248 |
| 2009/0254601 | A1 * | 10/2009 | Moeller et al. | 709/201 |
| 2011/0004637 | A1 * | 1/2011 | O'Farrell et al. | 707/809 |

OTHER PUBLICATIONS

"Enterprise Web Services Solutions", "http://www.wipro.com/webpages/itservices/ebusiness/webserv_gds.htm", Downloaded circa: Nov. 6, 2007, pp. 1.

(Continued)

*Primary Examiner* — Greg C Bengzon
(74) *Attorney, Agent, or Firm* — Narendra Reddy Thappeta

(57) ABSTRACT

Simplifying synchronization of copies of same data used by multiple applications, in particular, between a source application and multiple target applications. In one embodiment, a synchronization tool (provided external to the source application and the multiple target applications) pulls information of interest from a data store associated with the source application using a web service and then pushes the retrieved information of interest to corresponding data stores associated with the multiple target applications using respective web services.

24 Claims, 14 Drawing Sheets

(56) References Cited

OTHER PUBLICATIONS

"Staff Data Synchronization Process with Tranxnet at MTR Corporation Ltd", "http://www.cecid.hku.hk/images/casestudy/StaffDataSynchronizationProcess@MTRC.pdf", Date: 2005, pp. 1-3.

"Microsoft Synchronization Services for ADO.NET", "https://forums.microsoft.com/MSDN/ShowForum.aspx?ForumID=1225&SiteID=1", Downloaded circa: Nov. 6, 2007, pp. 1-4.

"Yajaman et al", "Web Service Facade for Legacy Applications, Microsoft Developer Network", "http://msdn2.microsoft.com/en-us/library/ms979218.aspx", Date: Jun. 2003, pp. 1-27.

* cited by examiner

```
301: [MAPPING_LIST]
302: list=InsertDataFromAToB, UpdateDataFromAToB, InsertDataFromAToC, UpdateDataFromAToC, QueryA-UpdateOrInsertB, DeleteFromB 303: [InsertDataFromAToB]
304: name=InsertDataFromAToB
305: opmap=OpMapAB.insertJ
306: sourcecriteria=[ListOfContactAInterface.ArrayOfContactAInterfaceTopElmt.ListOfContactAInterface.ArrayOfContactA.ContactA.CreatedDate]>=[LAST_OPR_RUN_TIME]
307: starttime=01/01/07 12:00 PM
308: schedule=30m
309: OBJECT=Contact
310: APP=A-B 311: [UpdateDataFromAToB]
312: name=UpdateDataFromAToB
313: opmap=OpMapAB.updateJ
314: sourcecriteria=[ListOfContactAInterface.ArrayOfContactAInterfaceTopElmt.ListOfContactAInterface.ArrayOfContactA.ContactA.LastUpdateDate]>=[LAST_OPR_RUN_TIME]
315: starttime=01/01/07 12:00 PM
316: schedule=30m
317: OBJECT=Contact
318: APP=A-B 319: [InsertDataFromAToC]
320: name=InsertDataFromAToC
321: opmap=OpMapAC.insertJ
322: sourcecriteria=[ListOfContactAInterface.ArrayOfContactAInterfaceTopElmt.ListOfContactAInterface.ArrayOfContactA.ContactA.CreatedDate]>=[LAST_OPR_RUN_TIME]
323: starttime=01/01/07 12:00 PM
324: schedule=15m
325: OBJECT=Contact
326: APP=A-C 327: [UpdateDataFromAToC]
328: name=UpdateDataFromAToC
329: opmap=OpMapAC.updateJ
330: sourcecriteria=[ListOfContactAInterface.ArrayOfContactAInterfaceTopElmt.ListOfContactAInterface.ArrayOfContactA.ContactA.LastUpdateDate]>=[LAST_OPR_RUN_TIME]
331: starttime=01/01/07 12:00 PM
332: schedule=15m
333: OBJECT=Contact
334: APP=A-C
```

*FIG. 3A*

```
335: [QueryA-UpdateOrInsertB]
336: name=QueryA-UpdateOrInsertB
337: opmap=OpMapAB.queryI->OpMapAB.updateJ|OpMapAB.insertJ
338: sourcecriteria=[ListOfContactAInterfaceTopElmt.ListOfContactAInterface.ArrayOfContactA.LastUpdateDate]>=[LAST_OPR_RUN_TIME]
339: mappingcriteria=FOREACH(queryI(sourcecriteria)){IF([ListOfContactAInterfaceTopElmt.ListOfContactAInterface.ArrayOfContactA.ContactA.ID]
                                                            ==[LOCAL_ID])THEN{OpMapAB.updateJ}ELSE{OpMapAB.insertJ}}
340: starttime=01/01/07 12:00 PM
341: schedule=30m
342: OBJECT=Contact
343: APP=A-B 344: [DeleteFromB]
345: name=DeleteFromB
346: opmap=OpMapAB.deleteJ
347: sourcecriteria=[ListOfContactAInterfaceTopElmt.ListOfContactAInterface.ArrayOfContactA.ContactA.Id]
                    ==[ListOfContactBInterfaceTopElmt.ListOfContactBInterface.ArrayOfContactB.ContactB.Id]
348: OBJECT=Contact
349: APP=A-B 350: [WEBSERVICE_OP_MAP]
351: list=OpMapAB, OpMapAC 352: [OpMapAB]
353: wsdlI=c:\contactA.wsdl
354: wsdlJ=c:\contactB.wsdl
355: insertJ=source:Acme_spcContactA.ContactAQuery;destination:Acme_spcContactB.ContactBInsert;
356: updateJ=source:Acme_spcContactA.ContactAQuery;destination:Acme_spcContactB.ContactBUpdate;
357: queryI=source:Acme_spcContactA.ContactAQuery;
358: deleteJ=destination:Acme_spcContactB.ContactBDelete;

359: [OpMapAC]
360: wsdlI=c:\contactA.wsdl
361: wsdlJ=c:\contactC.wsdl
362: insertJ=source:Acme_spcContactA.ContactAQuery;destination:Acme_spcContactC.ContactCInsert;
363: updateJ=source:Acme_spcContactA.ContactAQuery;destination:Acme_spcContactC.ContactCUpdate;

364: [WEBSERVICE_TYPE_MAP]
365: list=TypeMapAB, TypeMapAC
```

*FIG. 3B*

```
366: [TypeMapAB]
367: wsdlI=c:\contactA.wsdl
368: wsdlJ=c:\contactB.wsdl
369: ListOfContactAInterfaceTopElmt=ListOfContactBInterfaceTopElmt
370: ListOfContactAInterfaceTopElmt.ListOfContactAInterface=ListOfContactBInterfaceTopElmt.ListOfContactBInterface
371: ListOfContactAInterfaceTopElmt.ListOfContactAInterface.ArrayOfContactA.ContactA
       =ListOfContactBInterfaceTopElmt.ListOfContactBInterface.ArrayOfContactB.ContactB
372: ListOfContactAInterfaceTopElmt.ListOfContactAInterface.ArrayOfContactA.ContactA.Id
       =ListOfContactBInterfaceTopElmt.ListOfContactBInterface.ArrayOfContactB.ContactB.Id
373: ListOfContactAInterfaceTopElmt.ListOfContactAInterface.ArrayOfContactA.ContactA.EmailAddress
       =ListOfContactBInterfaceTopElmt.ListOfContactBInterface.ArrayOfContactB.ContactB.EmailAddress
374: ListOfContactAInterfaceTopElmt.ListOfContactAInterface.ArrayOfContactA.ContactA.FirstName
       =ListOfContactBInterfaceTopElmt.ListOfContactBInterface.ArrayOfContactB.ContactB.FirstName
375: ListOfContactAInterfaceTopElmt.ListOfContactAInterface.ArrayOfContactA.ContactA.LastName
       =ListOfContactBInterfaceTopElmt.ListOfContactBInterface.ArrayOfContactB.ContactB.LastName
376: ListOfContactAInterfaceTopElmt.ListOfContactAInterface.ArrayOfContactA.ContactA.LastUpdateDate
       =ListOfContactBInterfaceTopElmt.ListOfContactBInterface.ArrayOfContactB.ContactB.LastUpdateDate 377: [TypeMapAC]
378: wsdlI=c:\contactA.wsdl
379: wsdlJ=c:\contactC.wsdl
380: ListOfContactAInterfaceTopElmt=ListOfContactCInterfaceTopElmt
381: ListOfContactAInterfaceTopElmt.ListOfContactAInterface=ListOfContactCInterfaceTopElmt.ListOfContactCInterface
382: ListOfContactAInterfaceTopElmt.ListOfContactAInterface.ArrayOfContactA.ContactA
       =ListOfContactCInterfaceTopElmt.ListOfContactCInterface.CrrayOfContactC.ContactC
383: ListOfContactAInterfaceTopElmt.ListOfContactAInterface.ArrayOfContactA.ContactA.Id
       =ListOfContactCInterfaceTopElmt.ListOfContactCInterface.ArrayOfContactC.ContactC.Id
384: ListOfContactAInterfaceTopElmt.ListOfContactAInterface.ArrayOfContactA.ContactA.EmailAddress
       =ListOfContactCInterfaceTopElmt.ListOfContactCInterface.ArrayOfContactC.ContactC.EmailAddress
385: ListOfContactAInterfaceTopElmt.ListOfContactAInterface.ArrayOfContactA.ContactA.FirstName
       =ListOfContactCInterfaceTopElmt.ListOfContactCInterface.ArrayOfContactC.ContactC.FirstName
386: ListOfContactAInterfaceTopElmt.ListOfContactAInterface.ArrayOfContactA.ContactA.LastName
       =ListOfContactCInterfaceTopElmt.ListOfContactCInterface.ArrayOfContactC.ContactC.LastName
387: ListOfContactAInterfaceTopElmt.ListOfContactAInterface.ArrayOfContactA.ContactA.LastUpdateDate
       =ListOfContactCInterfaceTopElmt.ListOfContactCInterface.ArrayOfContactC.ContactC.LastUpdateDate 388: [WEBSERVICE_DEFN]
389: Acme_spcContactA.ContactAQuery:inputid=ListOfContactAInterfaceTopElmt.ListOfContactAInterface.ArrayOfContactA.ContactA.Id
       :outputid=ListOfContactAInterfaceTopElmt.ListOfContactAInterface.ArrayOfContactA.ContactA.Id
390: Acme_spcContactB.ContactBInsert:inputid=ListOfContactBInterfaceTopElmt.ListOfContactBInterface.ArrayOfContactB.ContactB.Id
       :outputid=ListOfContactBInterfaceTopElmt.ListOfContactBInterface.ArrayOfContactB.ContactB.Id
391: Acme_spcContactB.ContactBUpdate:inputid=ListOfContactBInterfaceTopElmt.ListOfContactBInterface.ArrayOfContactB.ContactB.Id
       :outputid=ListOfContactBInterfaceTopElmt.ListOfContactBInterface.ArrayOfContactB.ContactB.Id
```

*FIG. 3C*

```
401: <?xml version="1.0" encoding="UTF-8" ?>
402: <definitions xmlns="http://schemas.xmlsoap.org/wsdl/" xmlns:xsdLocal0="http://www.acme.com/xml/ContactAInterface"
403:    xmlns:soap="http://schemas.xmlsoap.org/wsdl/soap/" xmlns:soapenc="http://schemas.xmlsoap.org/soap/encoding/"
404:    xmlns:xsd="http://www.w3.org/2001/XMLSchema" xmlns:tns="http://acme.com/asl/" targetNamespace="http://acme.com/asl/">
405: <types>
406: <xsd:schema elementFormDefault="qualified" attributeFormDefault="unqualified" targetNamespace="http://www.acme.com/xml/ContactAInterface">
407:    <xsd:element name="ListOfContactAInterface" type="xsdLocal0:ListOfContactAInterface"/>
408:    <xsd:complexType name="ListOfContactAInterfaceTopElmt">
409:       <xsd:sequence>
410:          <xsd:element name="ListOfContactAInterface" maxOccurs="1" minOccurs="1" type="xsdLocal0:ListOfContactAInterface"/>
411:       </xsd:sequence>
412:    </xsd:complexType>
413:    <xsd:complexType name="ListOfContactAInterface">
414:       <xsd:sequence>
415:          <xsd:element name="ContactA" maxOccurs="1" minOccurs="0" type="xsdLocal0:ArrayOfContactA"/>
416:       </xsd:sequence>
417:    </xsd:complexType>
418:    <xsd:complexType name="ArrayOfContactA">
419:       <xsd:complexContent mixed="false" >
420:          <xsd:restriction base="soapenc:Array"/>
421:             <xsd:attribute aPrefix:arrayType="xsdLocal0:ContactA[]" ref="soapenc:arrayType" xmlns:aPrefix="http://schemas.xmlsoap.org/wsdl/"/>
422:          </xsd:restriction>
423:       </xsd:complexContent>
424:    </xsd:complexType>
425:    <xsd:complexType name="ContactA">
426:       <xsd:sequence>
427:          <xsd:element name="Id" maxOccurs="1" minOccurs="0" type="xsd:string"/>
428:          <xsd:element name="EmailAddress" maxOccurs="1" minOccurs="0" type="xsd:string"/>
429:          <xsd:element name="FirstName" maxOccurs="1" minOccurs="0" type="xsd:string"/>
430:          <xsd:element name="LastName" maxOccurs="1" minOccurs="0" type="xsd:string"/>
431:          <xsd:element name="LastUpdateDate" maxOccurs="1" minOccurs="0" type="xsd:string"/>
432:          <xsd:element name="CreatedDate" maxOccurs="1" minOccurs="0" type="xsd:string"/>
433:       </xsd:sequence>
434:    </xsd:complexType>
435: </xsd:schema>
436: </types>
437: <message name="ContactAQuery_Input"> <part name="AcmeMessage" type="xsdLocal0:ListOfContactAInterfaceTopElmt"/> </message>
438: <message name="ContactAQuery_Output"> <part name="AcmeMessage" type="xsdLocal0:ListOfContactAInterfaceTopElmt"/> </message>
439: <message name="ContactAUpdate_Input"> <part name="AcmeMessage" type="xsdLocal0:ListOfContactAInterfaceTopElmt"/> </message>
440: <message name="ContactAUpdate_Output"> <part name="AcmeMessage" type="xsdLocal0:ListOfContactAInterfaceTopElmt"/> </message>
```

*FIG. 4A*

```
441: <message name="ContactAInsert_Input"> <part name="AcmeMessage" type="xsdLocal0:ListOfContactAInterfaceTopElmt"/> </message>
442: <message name="ContactAInsert_Output"> <part name="AcmeMessage" type="xsdLocal0:ListOfContactAInterfaceTopElmt"/> </message>
443: <message name="ContactADelete_Input"> <part name="AcmeMessage" type="xsdLocal0:ListOfContactAInterfaceTopElmt"/> </message>
444: <message name="ContactADelete_Output"> <part name="AcmeMessage" type="xsdLocal0:ListOfContactAInterfaceTopElmt"/> </message>
445: <portType name="Default">
446:   <operation name="ContactAQuery"><input message="tns:ContactAQuery_Input"/><output message="tns:ContactAQuery_Output"/></operation>
447:   <operation name="ContactAUpdate"><input message="tns:ContactAUpdate_Input"/><output message="tns:ContactAUpdate_Output"/></operation>
448:   <operation name="ContactAInsert"><input message="tns:ContactAInsert_Input"/><output message="tns:ContactAInsert_Output"/></operation>
449:   <operation name="ContactADelete"><input message="tns:ContactADelete_Input"/><output message="tns:ContactADelete_Output"/></operation>
450: </portType>
451: <binding name="Default" type="tns:Default">
452:   <soap:binding transport="http://schemas.xmlsoap.org/soap/http" style="rpc"/>
453:   <operation name="ContactAQuery">
454:     <soap:operation soapAction="rpc/http://acme.com/asl/:ContactAQuery"/>
455:     <input><soap:body encodingStyle="http://schemas.xmlsoap.org/soap/encoding/" namespace="http://acme.com/asl/" use="encoded"/></input>
456:     <output><soap:body encodingStyle="http://schemas.xmlsoap.org/soap/encoding/" namespace="http://acme.com/asl/" use="encoded"/></output>
457:   </operation>
458:   <operation name="ContactAUpdate">
459:     <soap:operation soapAction="rpc/http://acme.com/asl/:ContactAUpdate"></soap:operation>
460:     <input><soap:body encodingStyle="http://schemas.xmlsoap.org/soap/encoding/" namespace="http://acme.com/asl/" use="encoded"/></input>
461:     <output><soap:body encodingStyle="http://schemas.xmlsoap.org/soap/encoding/" namespace="http://acme.com/asl/" use="encoded"/></output>
462:   </operation>
463:   <operation name="ContactAInsert">
464:     <soap:operation soapAction="rpc/http://acme.com/asl/:ContactAInsert"></soap:operation>
465:     <input><soap:body encodingStyle="http://schemas.xmlsoap.org/soap/encoding/" namespace="http://acme.com/asl/" use="encoded"/></input>
466:     <output><soap:body encodingStyle="http://schemas.xmlsoap.org/soap/encoding/" namespace="http://acme.com/asl/" use="encoded"/></output>
467:   </operation>
468:   <operation name="ContactADelete">
469:     <soap:operation soapAction="rpc/http://acme.com/asl/:ContactADelete"></soap:operation>
470:     <input><soap:body encodingStyle="http://schemas.xmlsoap.org/soap/encoding/" namespace="http://acme.com/asl/" use="encoded"/></input>
471:     <output><soap:body encodingStyle="http://schemas.xmlsoap.org/soap/encoding/" namespace="http://acme.com/asl/" use="encoded"/></output>
472:   </operation>
473: </binding>
474: <service name="Acme_spcContactA">
475:   <port binding="tns:Default" name="Default">
476:     <soap:address location="http://www.acme.com/eai_en/start.swe?SWEExt=WebService&UserName=john&Password=woo20"/>
477:   </port>
478: </service>
479: </definitions>
```

*FIG. 4B*

```
501: <?xml version="1.0" encoding="UTF-8" ?>
502: <definitions xmlns="http://schemas.xmlsoap.org/wsdl/" xmlns:xsdLocal0="http://www.acme.com/xml/ContactBInterface"
503:     xmlns:soap="http://schemas.xmlsoap.org/wsdl/soap/" xmlns:soapenc="http://schemas.xmlsoap.org/soap/encoding/"
504:     xmlns:xsd="http://www.w3.org/2001/XMLSchema" xmlns:tns="http://acme.com/asl/" targetNamespace="http://acme.com/asl/">
505: <types>
506: <xsd:schema elementFormDefault="qualified" attributeFormDefault="unqualified" targetNamespace="http://www.acme.com/xml/ContactBInterface">
507:   <xsd:element name="ListOfContactBInterface" type="xsdLocal0:ListOfContactBInterface"/>
508:   <xsd:complexType name="ListOfContactBInterfaceTopElmt">
509:     <xsd:sequence>
510:       <xsd:element name="ListOfContactBInterface" maxOccurs="1" minOccurs="1" type="xsdLocal0:ListOfContactBInterface"/>
511:     </xsd:sequence>
512:   </xsd:complexType>
513:   <xsd:complexType name="ListOfContactBInterface">
514:     <xsd:sequence>
515:       <xsd:element name="ContactB" maxOccurs="1" minOccurs="0" type="xsdLocal0:ArrayOfContactB"/>
516:     </xsd:sequence>
517:   </xsd:complexType>
518:   <xsd:complexType name="ArrayOfContactB">
519:     <xsd:complexContent mixed="false">
520:       <xsd:restriction base="soapenc:Array">
521:         <xsd:attribute aPrefix:arrayType="xsdLocal0:ContactB[]" ref="soapenc:arrayType" xmlns:aPrefix="http://schemas.xmlsoap.org/wsdl/"/>
522:       </xsd:restriction>
523:     </xsd:complexContent>
524:   </xsd:complexType>
525:   <xsd:complexType name="ContactB">
526:     <xsd:sequence>
527:       <xsd:element name="Id" maxOccurs="1" minOccurs="0" type="xsd:string"/>
528:       <xsd:element name="EmailAddress" maxOccurs="1" minOccurs="1" type="xsd:string"/>
529:       <xsd:element name="FirstName" maxOccurs="1" minOccurs="0" type="xsd:string"/>
530:       <xsd:element name="LastName" maxOccurs="1" minOccurs="1" type="xsd:string"/>
531:       <xsd:element name="LastUpdateDate" maxOccurs="1" minOccurs="0" type="xsd:string"/>
532:       <xsd:element name="CreatedDate" maxOccurs="1" minOccurs="0" type="xsd:string"/>
533:     </xsd:sequence>
534:   </xsd:complexType>
535: </xsd:schema>
536: </types>
537: <message name="ContactBQuery_Input"> <part name="AcmeMessage" type="xsdLocal0:ListOfContactBInterfaceTopElmt"/> </message>
538: <message name="ContactBQuery_Output"> <part name="AcmeMessage" type="xsdLocal0:ListOfContactBInterfaceTopElmt"/> </message>
539: <message name="ContactBUpdate_Input"> <part name="AcmeMessage" type="xsdLocal0:ListOfContactBInterfaceTopElmt"/> </message>
540: <message name="ContactBUpdate_Output"> <part name="AcmeMessage" type="xsdLocal0:ListOfContactBInterfaceTopElmt"/> </message>
```

*FIG. 5A*

```
541: <message name="ContactBInsert_Input"> <part name="AcmeMessage" type="xsdLocal0:ListOfContactBInterfaceTopElmt"/> </message>
542: <message name="ContactBInsert_Output"> <part name="AcmeMessage" type="xsdLocal0:ListOfContactBInterfaceTopElmt"/> </message>
543: <message name="ContactBDelete_Input"> <part name="AcmeMessage" type="xsdLocal0:ListOfContactBInterfaceTopElmt"/> </message>
544: <message name="ContactBDelete_Output"> <part name="AcmeMessage" type="xsdLocal0:ListOfContactBInterfaceTopElmt"/> </message>

545: <portType name="Default">
546:    <operation name="ContactBQuery"><input message="tns:ContactBQuery_Input"/><output message="tns:ContactBQuery_Output"/></operation>
547:    <operation name="ContactBUpdate"><input message="tns:ContactBUpdate_Input"/><output message="tns:ContactBUpdate_Output"/></operation>
548:    <operation name="ContactBInsert"><input message="tns:ContactBInsert_Input"/><output message="tns:ContactBInsert_Output"/></operation>
549:    <operation name="ContactBDelete"><input message="tns:ContactBDelete_Input"/><output message="tns:ContactBDelete_Output"/></operation>
550: </portType>

551: <binding name="Default" type="tns:Default">
552:    <soap:binding transport="http://schemas.xmlsoap.org/soap/http" style="rpc"/>
553:    <operation name="ContactBQuery">
554:       <soap:operation soapAction="rpc/http://acme.com/asi/:ContactBQuery"/>
555:       <input><soap:body encodingStyle="http://schemas.xmlsoap.org/soap/encoding/" namespace="http://acme.com/asi/" use="encoded"/></input>
556:       <output><soap:body encodingStyle="http://schemas.xmlsoap.org/soap/encoding/" namespace="http://acme.com/asi/" use="encoded"/></output>
557:    </operation>
558:    <operation name="ContactBUpdate" >
559:       <soap:operation soapAction="rpc/http://acme.com/asi/:ContactBUpdate"></soap:operation>
560:       <input><soap:body encodingStyle="http://schemas.xmlsoap.org/soap/encoding/" namespace="http://acme.com/asi/" use="encoded"/></input>
561:       <output><soap:body encodingStyle="http://schemas.xmlsoap.org/soap/encoding/" namespace="http://acme.com/asi/" use="encoded"/></output>
562:    </operation>
563:    <operation name="ContactBInsert">
564:       <soap:operation soapAction="rpc/http://acme.com/asi/:ContactBInsert"></soap:operation>
565:       <input><soap:body encodingStyle="http://schemas.xmlsoap.org/soap/encoding/" namespace="http://acme.com/asi/" use="encoded"/></input>
566:       <output><soap:body encodingStyle="http://schemas.xmlsoap.org/soap/encoding/" namespace="http://acme.com/asi/" use="encoded"/></output>
567:    </operation>
568:    <operation name="ContactBDelete">
569:       <soap:operation soapAction="rpc/http://acme.com/asi/:ContactBDelete"></soap:operation>
570:       <input><soap:body encodingStyle="http://schemas.xmlsoap.org/soap/encoding/" namespace="http://acme.com/asi/" use="encoded"/></input>
571:       <output><soap:body encodingStyle="http://schemas.xmlsoap.org/soap/encoding/" namespace="http://acme.com/asi/" use="encoded"/></output>
572:    </operation>
573: </binding>

574: <service name="Acme_spcContactB">
575:    <port binding="tns:Default" name="Default">
576:       <soap:address location="http://www.acmebackup.com/en/webservices.aspx?ID=10334"/>
577:    </port>
578: </service>
579: </definitions>
580:
```

FIG. 5B

```
611: POST /eal_en/start.swe?SWEExt=WebService&UserName=john&Password=woo20 HTTP/1.1
612: Host: http://www.acme.com
613: Content-Type: text/xml; charset="utf-8"
614: Content-Length: 368
615: SOAPAction: rpc/http://acme.com/asi/:ContactAQuery 616: <soap:Envelope xmlns:soap="http://schemas.xmlsoap.org/soap/envelope/">
617: <soap:Body xmlns:ns1="http://www.acme.com/xml/ContactAInterface">
618: <ns1:AcmeMessage>
619:    <ns1:ListOfContactAInterface>
620:       <ns1:ContactA>
621:          <ns1:CreatedDate>01/11/2007 11:30:00 AM</ns1:CreatedDate>
622:       </ns1:ContactA>
623:    </ns1:ListOfContactAInterface>
624: </ns1:AcmeMessage>
625: </soap:Body>
626: </soap:Envelope>
```

*FIG. 6A*

```
651: HTTP/1.1 200 OK Content-Type: text/xml; charset="utf-8"
652: Content-Length: 904
653: <soap:Envelope xmlns:soap="http://schemas.xmlsoap.org/soap/envelope/">
654: <soap:Body xmlns:ns1="http://www.acme.com/xml/ContactAInterface">
655: <ns1:AcmeMessage>
656:    <ns1:ListOfContactAInterface>
657:       <ns1:ContactA>
658:          <ns1:Id>A-1</ns1:Id>
659:          <ns1:EmailAddress>abc@xyz.com</ns1:EmailAddress>
660:          <ns1:FirstName>Abcdefghi</ns1:FirstName>
661:          <ns1:LastName>Zyx</ns1:LastName>
662:          <ns1:LastUpdateDate>23/11/2007 9:30:36 PM</ns1:LastUpdateDate>
663:          <ns1:CreatedDate>22/11/2007 22:14:27 PM</ns1:CreatedDate>
664:       </ns1:ContactA>
665:       <ns1:ContactA>
666:          <ns1:Id>A-3</ns1:Id>
667:          <ns1:EmailAddress>def@xyz.com</ns1:EmailAddress>
668:          <ns1:FirstName>Lmnopqrst</ns1:FirstName>
669:          <ns1:LastName>Tsrpqo</ns1:LastName>
670:          <ns1:LastUpdateDate>22/11/2007 9:30:36 PM</ns1:LastUpdateDate>
671:          <ns1:CreatedDate>22/11/2007 9:30:36 PM</ns1:CreatedDate>
672:       </ns1:ContactA>
673:    </ns1:ListOfContactAInterface>
674: </ns1:AcmeMessage>
675: </soap:Body>
676: </soap:Envelope>
```

*FIG. 6B*

711: POST /en/webservices.aspx?ID=10334 HTTP/1.1
712: Host: http://www.acmebackup.com
713: Content-Type: text/xml; charset="utf-8"
714: Content-Length: 563
715: SOAPAction: rpc/http://acme.com/asi/::ContactBinsert 716: <soap:Envelope xmlns:soap="http://schemas.xmlsoap.org/soap/envelope/">
717: <soap:Body xmlns:ns1="http://www.acme.com/xml/ContactBInterface">
718: <ns1:AcmeMessage>
719:   <ns1:ListOfContactBInterface>
720:     <ns1:ContactB>
721:       <ns1:EmailAddress>def@xyz.com</ns1:EmailAddress>
722:       <ns1:FirstName>Lmnopqrst</ns1:FirstName>
723:       <ns1:LastName>Tsrpqo</ns1:LastName>
724:       <ns1:LastUpdateDate>22/11/2007 9:30:36 PM</ns1:LastUpdateDate>
725:       <ns1:CreatedDate>22/11/2007 9:30:36 PM</ns1:CreatedDate>
726:     </ns1:ContactB>
727:   </ns1:ListOfContactBInterface>
728: </ns1:AcmeMessage>
729: </soap:Body>
730: </soap:Envelope>

*FIG. 7A*

761: HTTP/1.1 200 OK Content-Type: text/xml; charset="utf-8"
762: Content-Length: 329

763: <soap:Envelope xmlns:soap="http://schemas.xmlsoap.org/soap/envelope/">
764: <soap:Body xmlns:ns1="http://www.acme.com/xml/ContactBInterface">
765: <ns1:AcmeMessage>
766:   <ns1:ListOfContactBInterface>
767:     <ns1:ContactB>
768:       <ns1:Id>B-1116</ns1:Id>
769:     </ns1:ContactB>
770:   </ns1:ListOfContactBInterface>
771: </ns1:AcmeMessage>
772: </soap:Body>
773: </soap:Envelope>

*FIG. 7B*

| ID | APP | OBJECT | APP_I_ID | APP_J_ID |
|---|---|---|---|---|
| 151 | A-B | Contact | A-1 | B-1111 |
| 152 | A-B | Contact | A-2 | B-1112 |
| 153 | A-B | Contact | A-5 | - |

*FIG. 8*

```
921: POST /trigger.aspmx HTTP/1.1
922: Host: http://www.acmesynctool.com
923: Content-Type: text/xml; charset="utf-8"
924: Content-Length:
925: SOAPAction: rpc/http://acme.com/asi/:ToolTrigger 926: <soap:Envelope xmlns:soap="http://schemas.xmlsoap.org/soap/envelope/">
927:   <soap:Body xmlns:ns1="http://www.acme.com/xml/TriggerInterface">
928:     <ns1:AcmeMessage>
929:       <ns1:ListOfTriggerInterface>
930:         <ns1:Trigger>
931:           <ns1:tool_operation_name>DeleteFromB</ns1:tool_operation_name>
932:           <ns1:id>A-2</ns1:id>
933:           <ns1:object>Contact</ns1:object>
934:         </ns1:Trigger>
935:       </ns1:ListOfTriggerInterface>
936:     </ns1:AcmeMessage>
937:   </soap:Body>
938: </soap:Envelope>
```

*FIG. 9*

SIMPLIFYING SYNCHRONIZATION OF COPIES OF SAME DATA USED BY MULTIPLE APPLICATIONS

BACKGROUND

1. Technical Field

The present disclosure relates to distributed computing systems and more specifically to simplifying synchronization of copies of same data used by multiple applications.

2. Related Art

An application generally refers to a software program, which on execution performs a desired set of tasks. In general, the application executes in an operating environment (operating system, device drivers, etc.), which can be shared by other applications as well in the same digital processing system.

Applications often use data during execution. In general, an application contains program logic to process data, which can create additional data. The data thus processed or created, can be maintained internal or external to the digital processing system executing the application.

Multiple applications may need to operate on the same data, for example, created by one of the applications. In such a scenario, at least for applications executing on different digital processing systems, it may be beneficial to maintain multiple copies of the same data to facilitate faster retrieval, fault tolerance, scalability, etc.

Maintaining multiple copies of the same data may require that the data contained in the copies be synchronized, that is changes in data be propagated to all copies.

BRIEF DESCRIPTION OF THE DRAWINGS

Example embodiments of the present invention are described with reference to the accompanying drawings briefly described below.

FIGS. 3A, 3B, and 3C together depicts a portion of a configuration data specifying mappings indicating that information is to be synchronized between a source application and multiple target applications in one embodiment.

FIGS. 4A-4B together depicts the portion of a web service definition file (encoded in WSDL) corresponding to a source web service designed to retrieve information from a data store associated with a source application in one embodiment.

FIGS. 5A-5B together depicts the portion of a web service definition file (encoded in WSDL) corresponding to a target web service designed to store information in a data store associated with a specific target application in one embodiment.

FIG. 6A depicts a portion of a HTTP-SOAP request sent to a source web service for retrieving information of interest from a data store associated with a source application in one embodiment.

FIG. 6B depicts a portion of a HTTP-SOAP response received from a source web service containing the information of interest retrieved from a data store associated with a source application in one embodiment.

FIG. 7A depicts a portion of a HTTP-SOAP request sent to a target web service for storing information of interest in a data store associated with a specific target application in one embodiment.

FIG. 7B depicts a portion of a HTTP-SOAP response received from a target web service indicating the success/failure of storing of the information of interest in a data store associated with a specific target application in one embodiment.

FIG. 8 depicts a portion of a historical data indicating the information synchronized between a source application and each of multiple target applications in one embodiment.

FIG. 9 depicts a portion of a HTTP-SOAP request sent to a web service associated with sync tool 150 for triggering the performance of synchronization of an information of interest in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Definitions

Figure 1:
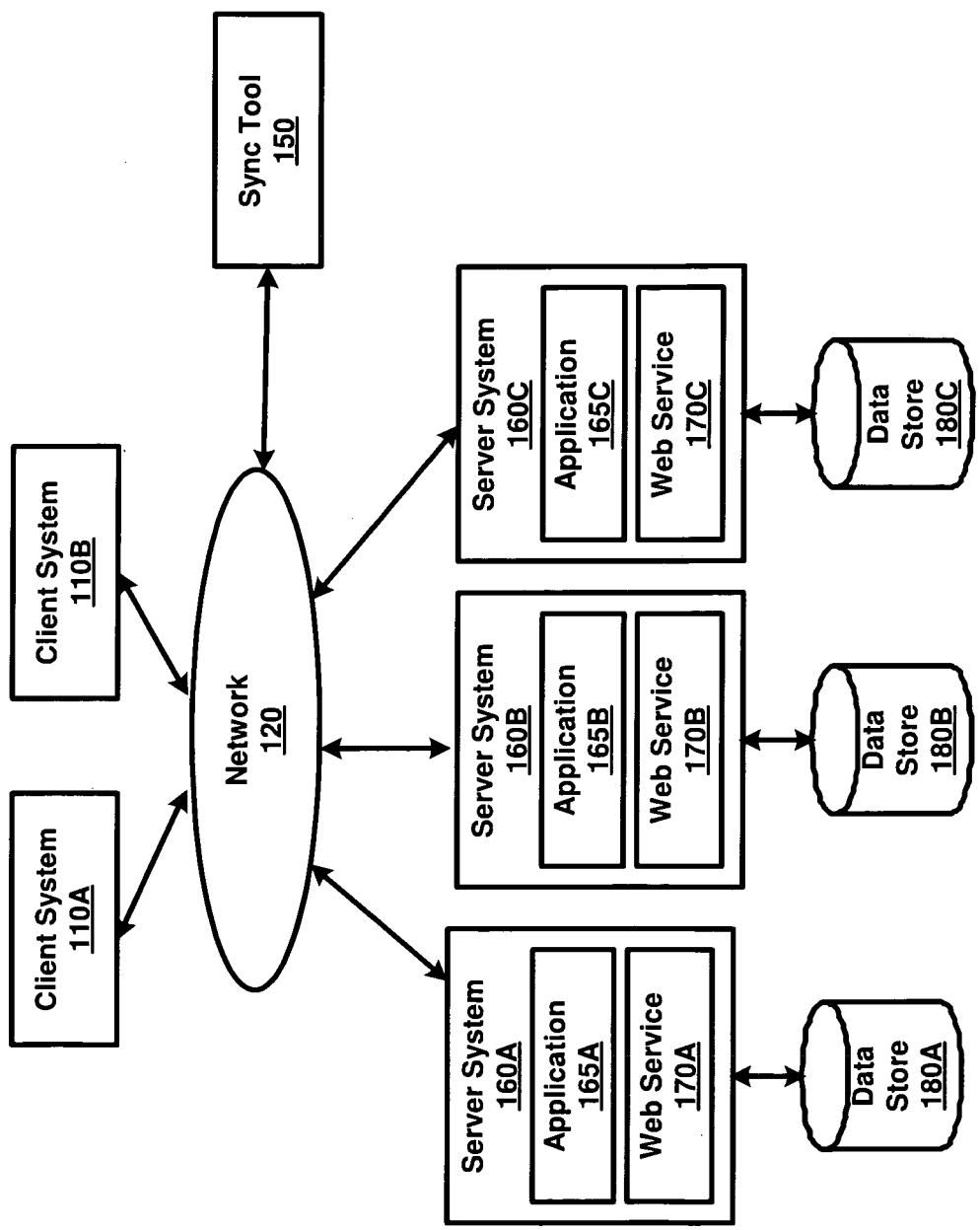
FIG. 1 is a block diagram illustrating an example environment (computing system) in which several aspects of the present invention can be implemented.

Web Service—A desired set of operations implemented by a programmer, which can be invoked from external applications. The operations can be any number and can have any identifier, as designed by the programmers. The operations in web services are based on any custom program logic (as desired by the programmers), in contrast to operations in non-web services, which provide a fixed/predefined utility and are identified by corresponding key words. Examples of non-web service environments include database, where key words are specified using structured query language (SQL).

Web Service Definition—A set of operations provided by a web service, including the name of each operation, the values that are required as parameters for executing a specific operation, the value(s) returned by each operation etc.

Pull—A sequence of actions retrieving data from a source data store.

Push—A sequence of actions sending data to a target data store.

Soft delete—Removing a data by marking the data as deleted (and/or inactive), such that the data still exists physically (in a memory) but is not made available (for general usage on par with non-deleted data) to external applications.

Hard delete—Removing a data permanently, such that the data does not exist physically (in a memory).

2. Overview

An aspect of the present invention simplifies synchronization of copies of same data used by multiple applications, in particular, between a source application and multiple target applications. In one embodiment, a sync tool pulls an information of interest using a first web service from a data store associated with the source application and then pushes the retrieved information of interest using a second web service to a data store associated with a specific target application.

The sync tool is provided external to the source application and the multiple target applications. Accordingly, the same sync tool may be used to synchronize data across any desired set of source applications and the corresponding set of target applications.

According to another aspect of the present invention, a configuration data specifying multiple mappings is maintained, with each mapping indicating that information is to be synchronized between the source application and one of the target applications. The configuration data may be examined to select a first mapping indicating that information is to be synchronized between the source application and the specific target application. Sync tool may then perform the above-described actions of pulling and pushing of information after selecting the first mapping.

In one embodiment, each web service is designed to provide a corresponding set of operations, which on invocation performs the actions of pulling and pushing of the information. As such, each mapping in the configuration data indicates the specific operations to be invoked in each web service for performing synchronization of information.

Thus, the first mapping may indicate that a first operation provided by the first web service is to be invoked for pulling the information of interest and that a second operation provided by the second web service is to be invoked for pushing the information of interest. Accordingly, sync tool pulls the information of interest from the data store associated with the source application by invoking the first operation and then pushes the information of interest to the data store associated with the specific target application by invoking the second operation.

Similarly, sync tool may select a second mapping (in the configuration data) indicating that information is to be synchronized between the source application and another target application. The second mapping may further indicate that a third operation provided by the first web service is to be invoked for pulling the information of interest and that a fourth operation provided by a third web service (designed to store data in a data store associated with another target application) is to be invoked for pushing the information of interest. Accordingly, sync tool pulls the information of interest by invoking the third operation and pushes the information of interest by invoking the fourth operation after selecting the second mapping.

According to an aspect of the present invention, in a scenario that different mappings (or a single mapping) in the configuration data indicate that the same first operation provided by the first web service is to be invoked for pulling the information of interest to be synchronized between a source application and multiple target applications, sync tool pulls the information of interest by invoking the first operation and then pushes the information of interest to each of the data stores (associated with the multiple target applications) by invoking the corresponding operations specified in the different mappings.

The manner of invocation of the operations provided by the different web services may be specified by respective web service definitions. For example, the manner of invocation of the operations provided by the first and second web services (noted above) may be specified by respective first and second web service definitions.

As such, pulling the information of interest may involve sending a request (according to an input format specified by the first web service definition) to the first web service for invoking the first operation, and receiving a response from the first web service containing the information of interest according to an output format specified by the first web service definition.

One more aspect of the present invention provides for the conversion of the received information of interest from the output format to another input format specified by the second web service definition. The converted information of interest is sent as another request to the second web service for invoking the second operation.

In one embodiment, the requests and responses are encoded in the form of Simple Object Access Protocol (SOAP) packets, while the first and second web service definitions are encoded in the form of Web Service Definition Language (WSDL) files.

According to another aspect of the present invention, the sync tool is designed to indicate a time instance after which changes in the source data store are sought to be retrieved, when pulling the information of interest. The web service at the source may be designed to send information on all the changes (inserts, updates, and soft deletes, but not on hard deletes) that have occurred in the source data stored after the indicated time instance.

The sync tool may synchronize various types of changes, some based on historical data (which indicate the previously synchronized information for each target application) as described below. Thus the specific one of a set of operations (provided by the second web service for pushing information as indicated by the first mapping) to be invoked is then determined based on the historical data and the information of interest retrieved from the data store associated with the source application.

In one embodiment, the second set of operations contains an insert, update, and delete operations designed respectively to perform the tasks of insertion, update, and deletion in a data store associated with a target application. The sync tool, then, determines that the insert operation is to be invoked if the historical data indicates that an information packet contained in the information of interest is not synchronized between the source application and the target application, and that the update operation is to be invoked otherwise.

The sync tool determines that the deletion operation is to be invoked when the retrieved information of interest indicates that an information packet has been soft deleted in the data store associated with the source application. The target web service may be conveniently implemented to perform either a soft delete (e.g., in case of a backup type of data store) or hard delete in the data store associated with the target application.

In addition, the sync tool may determine to invoke the delete operation in a scenario that the historical data indicates that another information packet not contained (but should have been received in response to the earlier query sent) in the retrieved information of interest is already synchronized between the source and target applications. Such invocation of the deletion operation may be desirable to synchronize data that is hard deleted in the data store associated with the source application.

According to an aspect of the present invention, the sync tool performs the actions of pulling and pushing the information of interest between a source application and multiple target applications in response to receiving an indication. In one embodiment, the indication is sent by either the source application or one of the target applications in the form of a request to a web service provided by the sync tool.

According to one more aspect of the present invention, a user interface using which a user/administrator may specify the operations to be invoked in source and target web services for performing synchronization of information is provided.

The operations specified may be stored associated with the corresponding mappings in the configuration data.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, with other methods, or combining one more aspects/features described herein, etc. In other instances, well-known structures or operations are not shown in detail to avoid obscuring the features of the invention.

3. Example Environment

FIG. 1 is a block diagram illustrating an example environment (computing system) in which several aspects of the present invention can be implemented. The block diagram is shown containing client systems 110A-110B, network 120, sync (synchronization) tool 150, server systems 160A-160C (shown containing respective applications 165A-165C and web services 170A-170C), and data stores 180A-180C.

Merely for illustration, only representative number/type of systems is shown in the Figure. Many environments often contain many more systems, both in number and type, depending on the purpose for which the environment is designed. Each block of FIG. 1 is described below in further detail.

Network 120 provides connectivity between various client systems 110A-110B, sync tool 150 and server systems 160A-160C. Network 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Each of data stores 180A-180C represents a non-volatile storage facilitating storage and retrieval of a collection of data by applications/web services executing in associated server systems 160A-160C. In one embodiment, each of data stores 180A-180C is implemented using relational database technologies and therefore provides storage and retrieval of data using structured queries such as SQL (Structured Query Language). SQL refers to a special-purpose, nonprocedural language that supports the definition, manipulation, and control of data in systems implementing relational database technologies.

Each of client systems 110A-110B represents a system such as a personal computer, workstation, mobile station, etc., used by an end user to generate (client) requests to applications (such as applications 165A-165C) executing in server systems 160A-160C. The requests may be generated using appropriate user interfaces. In general, a client system requests an application for performing desired tasks and receives corresponding responses containing the results of performance of the requested tasks from the application.

Each of server systems 160A-160C represents a server, such as a web/application server, which executes corresponding applications 165A-165C and web services 170A-170C. Each server system may also contain other software programs such as operating system, device drivers, etc., (not shown) that provides a (common) run time environment facilitating the execution of corresponding applications and web services.

Each of web services 170A-170C is designed to provide access to data stored in corresponding data stores 180A-180C. Each web service may provide a corresponding set of operations, using which other applications (external software programs) executing in one of the server/client systems may access the data stored in the corresponding data stores (in contrast to accessing the data directly). It should be appreciated that the program logic for the same operation on different server systems can be different, as suited to the corresponding environment.

Though the web services are shown as executing independently (i.e., external to applications and data store) in the run time environments of the corresponding server systems, in alternative embodiments, the web services may be provided as (a part of) either the corresponding applications 165A-165C or may be directly implemented in data stores 180A-180C. A software code is said to be external to an application if the instructions constituting the software code are either executing in external systems or at least in a separate execution context provided by the run-time environment in the same system.

Each of application 165A-165C represents a software program capable of performing tasks requested by users using one of client systems 110A-110B. An application may perform the tasks on data maintained internally or on external data (stored in one of data stores 180A-180C) and then send the result of performance of the tasks to the requesting client system.

In particular, application 165A (source application) generates and stores information of interest in data store 180A in response to requests from client systems, while applications 165B and 165C (target applications) performs the tasks (requested by client systems) on a copy of the information of interest maintained in corresponding data stores 180B and 180C. Accordingly, individual copies of the same data maintained in data stores 180A-180C may need to be synchronized.

Sync tool 150 provided according to several aspect of the present invention simplifies synchronization of copies of same data used by multiple applications using the appropriate web services as described below with examples.

4. Synchronizing Information

Figure 2:
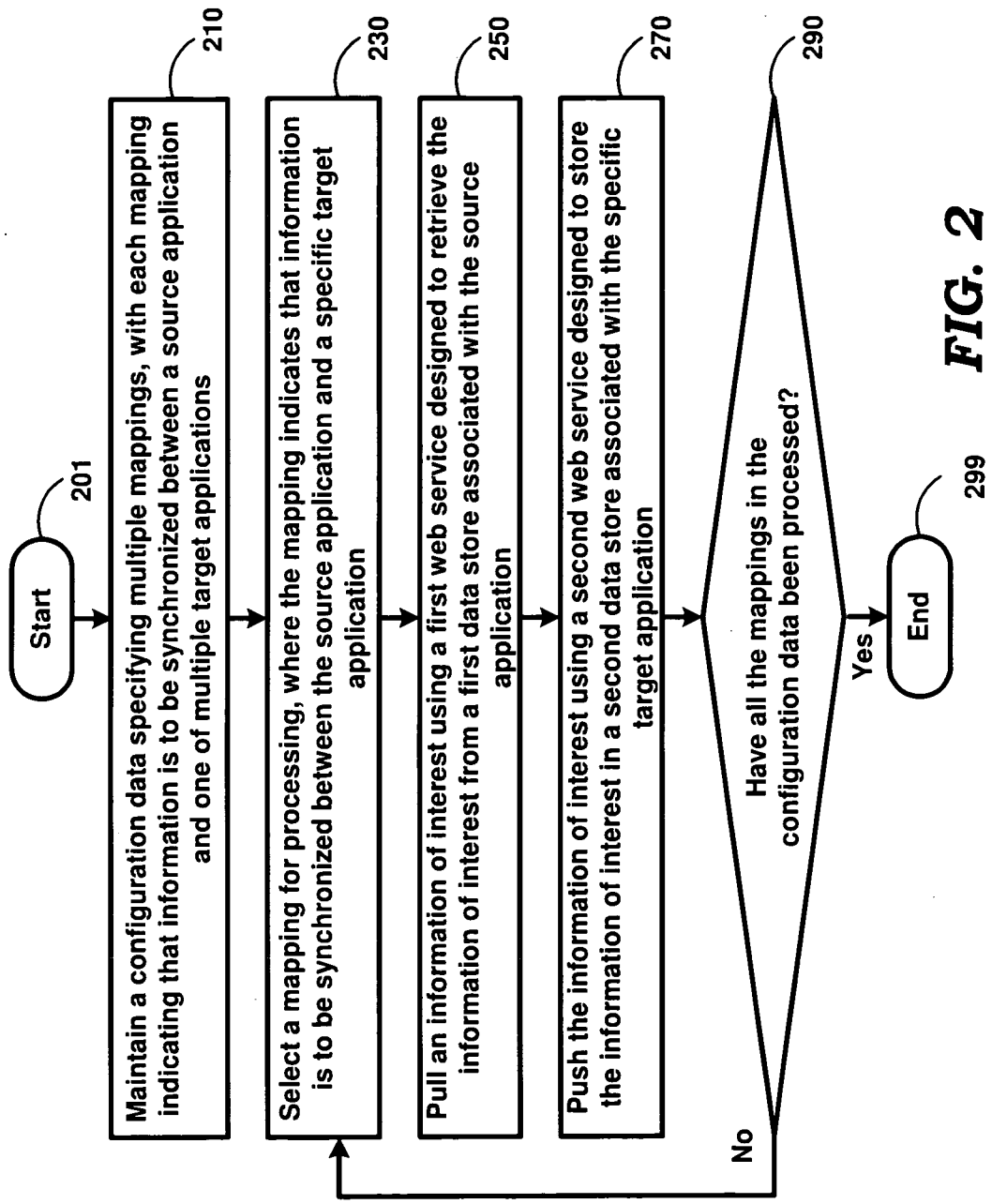
FIG. 2 is a flowchart illustrating the manner in which synchronization of copies of same data used by multiple applications is simplified according to an aspect of the present invention.

FIG. 2 is a flowchart illustrating the manner in which synchronization of copies of same data used by multiple applications is simplified according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, sync tool 150 maintains a configuration data specifying multiple mappings, with each mapping indicating that information is to be synchronized between a source application and one of multiple target applications. The configuration data may be maintained internally in sync tool 150 or externally in a database (not shown) associated with sync tool 150. The configuration data may be specified by a user/administrator using one of client systems 110A-110B and server systems 160A-160C.

For example, a first mapping in the configuration data may indicate that information is to be synchronized between application 165A (representing the source application) and application 165B (a target application), while a second mapping may indicate that the synchronization be performed between application 165A and application 165C (another target application). The combination of source and target applications for each synchronization can be specified using any convention as suited in the specific environment.

In step 230, sync tool 150 selects a mapping for processing, where the mapping indicates that information is to be synchronized between the source application and a specific target application. In general, the configuration data can indicate several mappings, and the specific one(s) to be used for synchronization can be based on any criteria as suited for the specific environment. Furthermore, though the mappings are described as being processed in serial in the flowchart, it should be appreciated that the mappings can be processed in parallel as well.

In one embodiment, the configuration data specifies respective date/time at which each mapping in the configuration data is to be performed. Sync tool 150 then selects the mapping for processing based on the respective dates/times, for example, by selecting the mapping having the current date/time. Alternatively, the configuration data may indicate the time intervals according to which corresponding mappings are to be performed periodically.

It may be appreciated that the mappings in the configuration data may be specified according to other scheduling schemes as well such as time based, priority based etc. with sync tool 150 being designed to select the mapping for processing accordingly as will be apparent to one skilled in the relevant arts by reading the disclosure herein.

For example, the selection of the mappings may be performed in the order in which the mappings are specified in the configuration data. Thus, in the above example, sync tool 150 may first select the first mapping (indicating that information is to be synchronized between applications 165A and 165B) for processing.

In step 250, sync tool 150 pulls an information of interest using a first web service designed to retrieve the information of interest from a first data store associated with the source application. The first web service may be designed to provide a corresponding first set of operations, with the configuration data indicating the specific operation to be invoked for pulling the information of interest. Accordingly, pulling the information of interest may involve sending a request to the first web service for invoking the specific operation, and receiving a response from the first web service containing the information of interest.

In the above example, the first mapping may indicate that the pulling of information is to be performed using a first operation provided by web service 170A, where web service 170A is designed to retrieve the information of interest from data store 180A (used by application 165A). Accordingly, sync tool 150 pulls the information of interest by sending (via network 120) a request to web service 170A for invoking the first operation and receiving (again via network 120) in response the information of interest (stored in data store 180A) from web service 170A.

In step 270, sync tool 150 pushes the information of interest using a second web service designed to store the information of interest in a second data store associated with the specific target application. As described above, the second web service may also be designed to provide a corresponding second set of operations, with the configuration data indicating a specific operation to be invoked for pushing the information of interest.

In the above example, the first mapping may further indicate that the pushing of information is to be performed using a second operation provided by web service 170B, where web service 170B is designed to store the information of interest in data store 180B (used by application 165B). Sync tool 150 may then push the information of interest by sending a request to web service 170B for invoking the second operation, thereby causing the information of interest to be stored in data store 180B. Sync tool 150 may receive a corresponding response from web service 170B indicating the success/failure of performance of the second operation.

Thus, by pulling and pushing the information of interest using the operations provided by web services (170A and 170B), the different copies of the information of interest maintained in different data stores (180A and 180B) and used by associated applications (165A and 165B) is synchronized.

In step 290, sync tool 150 determines whether all the mappings in the configuration data have been processed. Control passes to step 230 if there are more mappings to process and to step 299 otherwise. The flow chart ends in step 299.

In the above example, control is passed to step 230, and the second mapping may be selected for processing. The second mapping may indicate that the pulling of the information of interest is to be performed using the first operation (provided by web service 170A) and that the pushing of the information of interest is to be performed using a third operation provided by web service 170C, where web service 170C is designed to store the information of interest in data store 180C (used by application 165C).

Accordingly, sync tool 150 synchronizes the information of interest between applications 165A and 165C, by first pulling the information of interest using the first operation and then pushing the information of interest using the third operation. Sync tool 150 may repeat steps 250, 270 for each of the mapping specified in the configuration data, thereby ensuring that copies of the same data used by multiple applications are synchronized.

It may be appreciated that that the first and second mappings may indicate that the same first operation is to be performed for pulling the information of interest from data store 180A. According to an aspect of the present invention, sync tool 150 pulls the information of interest by invoking the first operation and then pushes the information of interest to each of data stores 180B and 180C by invoking the corresponding second and third operations provided by web services 170B and 170C respectively. Thus, the same information of interest is synchronized between a source application (165A) and multiple target applications (165B and 165C).

It may be observed that the synchronization of the information is based on the implementation of the web services and the mappings specified in the configuration data. A user/administrator may specify any desired set of mappings in the configuration data thereby controlling the manner in which synchronization of the information is performed. The description is continued describing the manner in which configuration data is specified by users/administrators in one embodiment.

5. Configuration Data

FIGS. 3A, 3B, and 3C together depicts a portion of a configuration data specifying mappings indicating that information is to be synchronized between a source application and multiple target applications in one embodiment. Though the content of FIGS. 3A-3C is shown in a specific format according to one convention, other encoding/formats and conventions may be used for representing the configuration data.

Broadly, the configuration data is divided into different sections, with each section having a heading (specified between square brackets) and a content containing multiple lines extending up to the next heading. Each line specifies a corresponding name-value pair separated by the character "=". Multiple values corresponding to the same name are specified as a comma-separated list of values.

Lines 301-302 (section "Mapping_List") specify the list of mappings in the configuration data. Line 302 indicates that the "list" of mappings contains "InsertDataFromAToB", "UpdateDataFromAToB", "InsertDataFromAToC", "UpdateDataFromAToC", "QueryA-UpdateOrInsertB", and "DeleteFromB". By convention, the details of each of the mappings are specified in corresponding sections of the configuration data.

Accordingly, lines 303-310 (section "InsertDataFromAToB") specify the details of a mapping with the corresponding name. In particular, line 304 specifies the name "InsertDataFromAToB" of the mapping, and line 305 indicates the specific operation mapping "OpMapAB.insertJ" to be used for synchronization. The details of the operation mappings are specified in other sections of the configuration data as described in detail below.

Line 306 indicates the criteria based on which the information is to be retrieved from the (source) data store associated with the source application. In particular, the criteria indicates that only the records in the source data store having the created date greater than or equal to the last run time (when the mapping was processed) are to be retrieved from the source data store. Such criteria ensure that only the newly added records are copied from the source data store to the (target) data store associated with the specific target application.

Line 307 indicates the start date/time instance "Jan. 7, 2007 12:00 PM" at which the synchronization process is to be performed for the first time, while line 308 indicates that the process is required to be scheduled to be repeated every 30 minutes (as indicated by the value "30 m"). Thus, the synchronization process is to be performed at "12:00 PM", "12:30 PM", "01:00 PM" etc.

Line 309 specifies the name "Contact" to identify the object (information of interest) being synchronized, while line 310 specifies a identifier "A-B" identifying the mapping, and generally indicates the names of the applications being synchronized. Thus, lines 309 and 310 together indicate that the information of interest "Contact" is being synchronized between a source application "A" and a specific target application "B" (which may correspond respectively to applications 165A and 165B).

Similarly lines 311-318 specify the details another mapping for synchronization of information between applications "A" and "B". Lines 319-326, and 327-334, respectively specify the details of the mappings "InsertDataFromAToC" and "UpdateDataFromAToC" which on execution synchronizes information of interest "Contact" between the source application "A" and another target application "C" (which may correspond respectively to applications 165A and 165C) as indicated in lines 325-326 and 333-334.

Lines 335-343 specify the details of the mapping "QueryA-UpdateOrInsertB". It may be observed that line 337 indicates that different operation mappings (such as "OpMapAB.updateJ" and "OpMapAB.insertJ") are to be performed for the same synchronization operations. Line 339 specifies the mapping criteria based on which the specific operation mapping to be performed is selected. The manner in which different operations (mappings) are selected and performed is described in detail in below sections.

Lines 344-347 specify the details of the mapping "DeleteFromB", and indicates the synchronization to be performed in a scenario that a record is deleted from the source data store.

Lines 350-351 (section "Webservice_Op_Map") specify the list of operation mapping sets in the configuration data. Line 351 indicates that the "list" of operation mapping sets contains "OpMapAB", and "OpMapAC".

Each operation mapping set specifies the operation mappings between a source and a target web service (corresponding to a source application and a specific target application sought to be synchronized). Each operation mapping in turn indicates the specific operations to be invoked in the source and the target web services. Further, the operating mapping set also indicates that specific web service definitions according to which the specific operations are to be invoked.

Thus, the operation mapping set "OpMapAB" specifies the details of the operations mappings used to synchronize information between the source application "A" and the specific target application "B". By convention, the details of each of the operation mapping sets are specified in corresponding sections of the configuration data.

Accordingly, lines 352-358 (section "OpMapAB") specify the details of an operation mapping set with the corresponding name. By convention, the source application is referred to as "I" and the specific target application is referred to as "J". Thus, lines 353 and 354 respectively specify the web service definition files "c:\contactA.wsdl" and "c:\contactB.wsdl" corresponding to the source and the target web services (which may correspond respectively to web services 170A and 170B).

It may be appreciated that the web service definition files may be maintained along with the configuration data by sync tool 150 to facilitate synchronization. The definition files may be provided by a user/administrator or alternatively may be retrieved from the corresponding web services using techniques well known in the relevant arts (e.g., using '?WSDL' as described in the book titled "Web Services Essentials—Distributed Applications with XML-RPC, SOAP, UDDI & WSDL" by Ethan Cerami having ISBN number 0-596-00224-6).

Line 355 indicates a specific operation mapping "insertJ" as a mapping between the source operation "Acme_spcContactA.ContactAQuery" (as indicated by "source:") and the target operation "Acme_spcContactB.ContactBInsert" (as indicated by "destination:"). As described above, the specific manner of invocation of the source and target operations are specified in the corresponding web service definition files indicated in lines 353 and 354. Similarly lines 356-358 indicate other operation mappings between source application "A" and target application "B".

It may be observed that the operation mapping "insertJ" is referred to in the mapping "InsertDataFromAToB" (in line 305) indicating that the corresponding source and target operations (in line 355) are to be used to perform synchronization of information between source application "A" and target application "B" when sync tool 150 processes the mapping in steps 250 and 270.

Similarly, lines 356-363 (section "OpMapAC") specify the details of the operation mapping set used to synchronize information between the source application "A" and another target application "C".

Lines 364-365 (section "Webservice_Type_Map") specify the list of type mapping sets in the configuration data. Line 365 indicates that the "list" of type mapping sets contains "TypeMapAB", and "TypeMapAC".

Each type mapping set specifies the manner in which data received from source operations are to be transformed to enable the target operations to be invoked. Thus, each type mapping set specifies the manner in which data is to be transformed from a first format (as specified by the source web service definition) to a second format (as specified by the target web service definition). Each type mapping in turn indicates the target data type corresponding to a specific source data type.

Thus, the type mapping set "TypeMapAB" specifies the manner in which data is to be transformed when information is synchronized between the source application "A" and the specific target application "B". By convention, the details of each of the type mapping sets are specified in corresponding sections of the configuration data.

Accordingly, lines 366-376 (section "TypeMapAB") specify the details of a type mapping set with the corresponding name. Lines 367 and 368 specify the details of the web service definition files corresponding to the source and target web services similar to lines 353 and 354.

Line 369 indicates that the source data type "ListOfContactAInterfaceTopElmt" is to be mapped to the corresponding target data type "ListOfContactBInterfaceTopElmt" before invoking the target operations. Similarly, lines 370-376 specify the target data types to be mapped corresponding to specific source data types.

Similarly, lines 377-387 (section "TypeMapAC") specify the details of another type mapping set used to transform data when information is synchronized between the source application "A" and another target application "C".

Lines 388-391 (section "Webservice_Defn") specify the unique identifiers corresponding to the source and target operations. In particular, line 389 indicates that for the operation "Acme_spcContactA.ContactAQuery" the element specified as "inputid:" is the unique identifier in the request, while the element specified as "outputid:" represents the unique identifier in the corresponding response.

Thus, the configuration data used to indicate the manner of synchronization of copies of the same data (such as "Contact") used by multiple applications (such as "A", "B" and "C" corresponding to applications 165A-165C) is specified. It may be observed that the configuration data specifies only one-to-one mappings between the source and target applications desired to be synchronized. However, other types of mappings such as one-to-many, many-to-many mappings etc between the source and target applications can also be implemented as will be apparent to one skilled in the relevant arts by reading the disclosure provided herein.

It may be appreciated that the configuration data of the example of FIGS. 3A-3C does not indicate the specific information to be synchronized between a source application and a specific target application. The specific information to be synchronized is determined by the operations (for pulling and pushing) specified in the mappings provided in other portions of the configuration data. As such, it may be necessary that the (first and second) web services be designed to provide compatible operations.

Alternatively, the configuration data may be suitably modified to indicate the specific information to be specified. Sync tool 150 may then be designed to identify the specific operations to be used for pulling and pushing of the specific information based on the web service definitions corresponding to the web services.

It may be further appreciated that the manner in which the operations are to be invoked are specified in the web service definitions. In one embodiment, the web service definitions are provided in the form of files encoded in Web Service Definition Language (WSDL) as described below with examples.

6. Web Service Definitions

FIGS. 4A-4B and 5A-5B depict portions of web service definition files (encoded in WSDL) corresponding to a source and a target web services in one embodiment. Though the content of FIGS. 4A-4B and 5A-5B is shown encoded in WSDL according to one convention, other encoding/formats and conventions may be used for representing the web service definitions.

It is assumed that that the WSDLs shown in FIGS. 4A-4B and 5A-5B corresponding to the source and target web services (for example, 170A and 170B) may be provided in files respectively named "contactA.wsdl" and "contactB.wsdl", and therefore correspond to the web service definition files specified in lines 353 and 354 of the configuration data. Each of the Figures is described in detail below.

FIGS. 4A-4B together depicts the portion of a web service definition file (encoded in WSDL) corresponding to a source web service (170A of FIG. 1) designed to retrieve information from a data store (180A) associated with a source application (165A) in one embodiment.

Line 401 indicates that the following data is encoded in eXtended Markup Language (XML). Lines 402-480 (between tags "<definitions>" and "</definitions>") represents a web service definition specifying the operations provided by a (source) web service (for pulling information of interest).

By convention, the tags "<definitions>" and "</definitions>" along with the data specified between the tags together is referred to as an element having "definitions" as the name and the data as the corresponding value. Only the names of the elements are referred to in the following description for conciseness.

Lines 402-404 specify different namespace identifiers (as attributes of the element "definitions") used to uniquely identify the different tags contained in the web service definition. In general, namespaces enable developers to use qualified names to refer to tags by using the namespace identifiers as prefixes. Namespaces can also be used to connect the different WSDL elements to the data types specified in the "types" element.

Lines 404-436 (element "types") specifies different data types corresponding to the data received/sent from the source web service. Data types specify the different elements that can be contained in the received/sent data. Different conventions can be used to specify the data types, though in the example, the data types are shown as being specified using XML schema. The data types can also be specified as separate resources/files.

Lines 406-435 (element "xsd:schema") specify the different data types using XML schema. In particular, line 407 (element "xsd:element") specifies a element "ListOfContactAInterface" (attribute "name") of the data type "ListOfContactAInterface" (attribute "type").

Lines 408-412 specify the details of a data type "ListOfContactAInterfaceTopElmt" as containing a sequence of "ListOfContactAInterface" elements. Similarly, lines 413-417 specify that the data type "ListOfContactAInterface" contains a sequence of "ContactA" elements, with each "ContactA" element having the data type "ArrayOfContactA". Lines 418-425 specify that the data type "ArrayOfContactA" is an array type containing one or more occurrences of the element "ContactA" (as indicated in line 421).

Lines 425-434 specify the details of the data type "ContactA" as containing a sequence of the different elements specified in lines 427-432 such as "Id", "EmailAddress", "FirstName", "LastName", "LastUpdateDate", and "CreatedDate". It may be observed that the type "xsd:string", the minimum number of occurrences "0" and the maximum number of occurrences "1" of each element is also specified.

Line 437 (element "message") specifies the data format of a specific request/response in the communication with the web service. In particular, the message is indicated to be having the name "ContactAQuery_Input" and containing a part/element with name "AcmeMessage" of data type "ListOfContactAInterfaceTopElmt" (specified in lines 408-412). Similarly, each of lines 438-444 specify the data format of other corresponding requests/responses received/sent by the source web service.

It may be observed that line 437 specifies the data format of the request/input for the operation "ContactAQuery" while line 438 specifies the data format of the response/output of the same operation "ContactAQuery". Further, each message is specified as containing only a single part/element. However, a message may contain multiple parts/elements, for example, when a message corresponds to a remote procedure call, different parts may be used to represent the name of the procedure to be invoked, the parameters of the procedure, associated metadata etc.

Lines 445-450 (element "portType") specify the different operations provided by the (source) web service. In particular, line 446 (element "operation") specifies a single operation with name "ContactAQuery" accepting the input/request in the format specified as "ContactAQuery_Input" (in line 437) and providing the output/response in the format specified as "ContactAQuery_Output" (in line 438).

Similarly, each of lines 447-449 specifies other corresponding operations and the data formats of the corresponding requests and responses. Though the operations are specified as being request-response type of operations, it may be appreciated that WSDL supports other types of operations such as one-way, solicit-response, notification etc.

Lines 451-473 (element "binding") specifies the manner in which the requests/responses corresponding to the operations are transmitted on the network. Line 452 indicates that the network packets constituting the requests/responses to/from the web service are encoded using Simple Object Access Protocol (SOAP) and provided using Hypertext Transfer Protocol (HTTP).

Lines 453-457 specify that the operation "ContactAQuery" (specified in line 446) is a SOAP operation and that the input/request and the output/response corresponding to the operation are also encoded using SOAP. It may be appreciated that the value "rpc/http://acme.com/asi/:ContactAQuery" corresponding to the attribute "soapAction" represents the value to be used in the in the HTTP headers of the network packets (to indicate that the operation "ContactAQuery" is to be performed).

Similarly, lines 458-462, 463-467, and 468-472 specify that the respective operations defined in lines 447-449 are also SOAP operations, with the corresponding requests/responses encoded using SOAP and that the corresponding values of the attribute "soapAction" are to be included in the HTTP header to indicate respective operations. Though the operations are shown to be encoded using SOAP, it may be appreciated that WSDL also provides bindings to other protocols such as HTTP, MIME, etc.

Lines 474-479 (element "service") specify a physical location for communication with the web service, for example, the web address or URL of a physical server (such as server system 160A) hosting the (source) web service. Thus, the value of the attribute "location" in line 476 indicates the specific URL to be used as the destination address of the network packets when requests are to be sent to the (source) web service.

Further, the respective values of the "binding" and "name" attributes in line 475 indicate that the web service provided at the location is based on the binding specified in lines 451-473 and provides operations specified in lines 445-450 (element "portType"). The "service" element may contain other URLs (corresponding to other server systems) providing the same web service.

Thus, the web service definition of the source web service designed to retrieve information from a data store associated with a source application is specified. The description is continued describing the manner in which the web service definition for a target web service is provided in one embodiment.

FIGS. 5A-5B together depicts the portion of a web service definition file (encoded in WSDL) corresponding to a target web service (for example, 170B of FIG. 1) designed to store information in a data store (180B) associated with a specific target application (165B) in one embodiment.

Lines 501-580 specify the details of the operations provided by a (target) web service which may be used for pushing information of interest. Lines 501-580 are similar to lines 401-480 and therefore the description is not repeated for conciseness.

It may be observed that the data types specified in lines 505-536 are similar to the data types specified in lines 405-436 and differ only in the names. However, any desired types and combinations of elements may be specified. Similarly, the bindings (element "binding"), the operations (element "portType"), and the corresponding data formats (element "message") specified in the target WSDL are similar to the bindings, operations and data formats specified in the source WSDL (shown in FIGS. 4A-4B) and differ only in the names.

It may be further observed that that the URL to which requests to the target web service are to be directed to (as indicated in line 576) is different from the URL specified in the source WSDL, since the URL corresponds to the target server system (such as server system 160B) providing the target web service.

Thus, the web service definition of the source and the target web services are provided in one embodiment. The web service definitions of other target web services may similarly be provided. The source and multiple target web service definitions may be used by sync tool 150 in processing the mappings specified in the configuration data as described in detail below.

7. Processing Mappings in the Configuration Data

Sync tool 150 processes the mappings in the configuration data shown in FIGS. 3A-3C based on the schedule times specified corresponding to the mappings. Assuming that the configuration data is stored in a non-volatile memory, some or all of the configuration data may be retrieved and examined to select the specific mappings to be processed. Alternative techniques such as triggers/events can also be used in selecting specific mapping.

In a scenario that different mappings are to be processed at the same time instance, sync tool 150 selects the mappings in the order of specification in the configuration data. Thus, at the time instance "Jan. 1, 2007 12:00 PM", sync tool 150 first selects the mapping "InsertDataFromAToB" (shown in lines 303-310) for processing in step 230, thereby causing information to be synchronized between (source) application 165A and (specific target) application 165B using the corresponding web services 170A and 170B.

Sync tool 150 first identifies the operation mapping "OpMapAB.insertJ" (as indicated in line 305) corresponding to the selected mapping. The configuration data is then inspected to determine the source operation "Acme_spcContactA.ContactAQuery" and the target operation "Acme_spc-ContactB.ContactBInsert" (as indicated in line 355) corresponding to the identified operation mapping.

Sync tool 150 then determines the manner of invocation of the source operation "ContactAQuery" by inspecting the web service definition file "contactA.wsdl" corresponding to the source web service (as indicated in line 353). Sync tool 150 then inspects the file "contactA.wsdl" to determine the location of the web service (line 476), the soap action to be specified in the HTTP header corresponding to the source operation (line 454), and the encoding to be used for the request/response (lines 455 and 456).

Sync tool 150 also determines that the request data format contains an occurrence of the element "AcmeMessage" (as indicated by lines 446 and 437). The element "AcmeMessage" in turn can contain an occurrence of the element "ListOfContactAInterface" (as indicated by line 408-412), which in turn can contain multiple occurrences of the element "ContactA" (as indicated by lines 412-417). Each occurrence of the element "ContactA" may contain other elements such as "Id", "EmailAddress", "CreatedDate" etc (as indicated by lines 425-434).

Sync tool 150 then inspects the selected mapping to determine the source criteria (as indicated in line 306) which indicates that only the records having the element "CreatedDate" greater than or equal to the last operation run time are to be retrieved. Accordingly, sync tool 150 generates a SOAP request to the source web service for invoking the source operation "ContactAQuery", thereby causing information of interest to be pulled from the source data store as described below with examples.

8. Pulling Information of Interest

FIGS. 6A and 6B illustrate the manner in which pulling of information of interest from a data store (180A in FIG. 1) associated with a source application (165A) is performed using a corresponding source web service (170A) in one embodiment. Each of the Figures is described in detail below.

As described above, sync tool 150 first inspects the configuration data for the selected mapping "InsertFromAToB" to determine the manner in which the SOAP request for invoking the source operation is to be specified. Sync tool 150 then generates an appropriate SOAP request as described in detail below.

FIG. 6A depicts a portion of a HTTP-SOAP request sent to a source web service for retrieving information of interest from a data store associated with a source application in one embodiment.

Lines 611-615 depict the details of the HTTP header of the request. In particular, line 611 indicates the location/URL of the source web service while line 612 indicates the location/URL of the server system hosting the web service. It may be observed that the concatenation of the text in lines 612 and 611 corresponds to the address location specified in line 476 in the source web service definition (depicted in FIGS. 4A-4B), thereby indicating that the HTTP-SOAP request is directed to the source web service.

Line 613 indicates the content type as containing XML data encoded using "utf-8", while line 614 indicates the length of the content as containing 368 characters. Line 615 indicates the SOAP action "rpc/http://acme.com/asi/:ContactAQuery" to be performed. It may be observed that the value of the SOAP action corresponds to the operation "ContactAQuery" (as specified in lines 453-457 in the source web service definition), thereby indicating the operation to be invoked.

Lines 616-626 (element "soap:envelope") depict the details of the SOAP message included in the request. In particular, lines 618-624 (element "AcmeMessage") is shown containing elements "ListOfContactAInterface", "ContactA" and "CreatedDate" according to the data format specified in the source web service definition as described above. It may be observed that the element "CreatedDate" is associated with a value "Jan. 11, 2007 11:30 AM" representing the last operation run time as indicated by the source criteria in the configuration data (in line 306).

On receiving the above SOAP request, the source web service (170A) performs the query operation specified in the request and generates a corresponding response containing the information of interest retrieved from the data store (180A) associated with the source application (165A). The source web service then sends the corresponding response to sync tool 150 as described in detail below.

FIG. 6B depicts a portion of a HTTP-SOAP response received from a source web service (in response to the SOAP request shown in FIG. 6A) containing the information of interest retrieved from a data store associated with a source application in one embodiment.

Lines 651-652 depict the details of the HTTP header of the response. In particular, line 651 indicates the successful transmission of the network packet (as indicated by the value 200) while line 652 indicates length of the content included in the response.

Lines 653-676 (element "soap:envelope") depict the details of the SOAP message included in the response. In particular, lines 655-674 (element "AcmeMessage") is shown containing element "ListOfContactAInterface", which in turn is shown containing multiple occurrence of the element "ContactA". Each occurrence of the element "ContactA" (corresponding to a record) is shown containing corresponding information retrieved from the data store associated with the source application. It may be observed that the created date of the records are greater than the last operation run time indicated in the SOAP request of FIG. 6A.

It should be appreciated that various underlying transports (e.g., TCP/UDP on top of IP) support the above noted pulling according to the corresponding protocols. Sync tool 150 may send the requests above to pull the data, while using any of such transports. Sync tool 150 may similarly push data using transports provided at the lower levels.

After receiving the above response from the source web service, sync tool 150 prepares for the performance of the target operation "ContactBInsert" corresponding to the selected mapping "InsertDataFromAToB" which synchronizes information between source application "A" (application 165A) and specific target application "B" (application 165B).

Accordingly, sync tool 150 first determines manner of invocation of the target operation "ContactBInsert" by inspecting the web service definition file "contactB.wsdl" corresponding to the target web service (as indicated in line 354). Sync tool 150 then inspects the file "contactB.wsdl" to determine the location of the web service (line 576), the soap action to be specified in the HTTP header corresponding to the source operation (line 554), and the encoding to be used for the request/response (lines 555 and 556).

Sync tool 150 also determines that the request data format contains an occurrence of the element "AcmeMessage" (as indicated by lines 546 and 537). The element "AcmeMessage" in turn can contain an occurrence of the element "ListOfContactBInterface" (as indicated by line 508-512), which in turn can contain multiple occurrences of the element "ContactB" (as indicated by lines 512-517). Each occurrence of the element "ContactB" may contain other elements such as "Id", "EmailAddress", "CreatedDate" etc (as indicated by lines 525-534).

Sync tool 150 then inspects the configuration data to determine the type mapping between applications "A" and "B" indicating the target data type corresponding to each specific source data type (as indicated in lines 369-376). Accordingly, sync tool 150 generates and sends a SOAP request to the target web service for invoking the target operation "ContactBInsert", thereby causing information of interest to be pushed to the target data store as described below with examples.

9. Pushing Information of Interest

FIGS. 7A and 7B illustrate the manner in which pushing of information of interest to a data store (180B in FIG. 1) associated with a specific target application (165B) is performed using a corresponding source web service (170B) in one embodiment. Each of the Figures is described in detail below.

Sync tool 150 first inspects the configuration data for the selected mapping "InsertFromAToB" to determine the manner in which the SOAP request for invoking the target operation is to be specified. Sync tool 150 then converts the information of interest (received from the source web service) from a source data format to a target data format based on the type mapping specified in the configuration data. Sync tool 150 then generates an appropriate SOAP request (to the target web service) containing the information of interest in the target data format as described in detail below.

FIG. 7A depicts a portion of a HTTP-SOAP request sent to a target web service for storing information of interest in a data store associated with a specific target application in one embodiment.

Lines 711-715 depict the details of the HTTP header of the request. Lines 711-715 are similar to lines 611-615 and therefore the description is not repeated for conciseness. It may be observed that the HTTP-SOAP request is directed to the target web service (based on the combined text in lines 712 and 711) for invoking the operation "ContactBInsert" (as indicated by the SOAP action in line 715).

Lines 716-730 (element "soap:envelope") depict the details of the SOAP message included in the request. In particular, lines 718-728 (element "AcmeMessage") is shown containing elements "ListOfContactBInterface", "ContactB", "EmailAddress", "FirstName", "LastName", "LastUpdateDate" and "CreatedDate" according to the data format specified in the target web service definition as described above.

It may be observed that the value of the elements included in the request is based on the values of the corresponding source data types/element as indicated by the type mapping in the configuration data. As such, the values of the elements in lines 721-725 corresponding to the value specified in lines 659-663, which have been converted by sync tool 150 to the target data format based on the configuration data.

On receiving the SOAP request, the target web service (170B) performs the insert operation specified in the request, thereby causing the information of interest to be stored in the data store (180B) associated with the specific target application (165B). The target web service may then generate and send a corresponding response to sync tool 150 as described in detail below.

FIG. 7B depicts a portion of a HTTP-SOAP response received from a target web service (in response to the SOAP request shown in FIG. 7A) indicating the success/failure of storing of the information of interest in a data store associated with a specific target application in one embodiment.

Lines 761-762 depict the details of the HTTP header of the response. Lines 761-762 are similar to lines 651-652 and indicate the successful transmission of the network packet.

Lines 763-773 (element "soap:envelope") depict the details of the SOAP message included in the response. In particular, lines 765-771 (element "AcmeMessage") are shown containing elements "ListOfContactAInterface", "ContactB" and "Id". The value of the element "Id" indicates the identifier of the record corresponding to the insertion of the element "ContactB" in the data store associated with a specific target application. The identifier may be used to maintain historical data as described below with examples.

Thus, sync tool 150 processes the mapping "InsertDataFromAToB" specified in the configuration data, thereby causing the information of interest to be pulled from a first data store (180A) associated with a source application (165A) using a first web service (170A) and then pushed to a second data store (180B) associated with a specific target application (165B) using a second web service (170B).

Similarly, sync tool 150 may process the other mappings specified in the configuration data (such as "UpdateDataFromAToB", "InsertDataFromAToC", and "UpdateDataFromAToC") thereby causing the different copies of the same data used by multiple applications to be synchronized.

It may be appreciated that the synchronization of information between the source application and multiple target applications is based on a one-to-one mapping of the operations provided by the source and target web services. The mapped operations are designed to be compatible with each other to enable sync tool 150 to perform synchronization.

It may be desirable that different target operations be invoked, for example, based on a condition or the information of interest being synchronized. An aspect of the present invention enables different operations of a target web service to be invoked based on a historical data maintained by sync tool 150. The historical data indicates the information synchronized between a source application and each of the multiple target applications.

Sync tool 150 determines the specific one of the target operations to be invoked based on the historical data and the information of interest received from the source web service as described below with examples.

10. Determining Operations Based on Historical Data

Referring to FIG. 3B, lines 335-343 specify a mapping "QueryA-UpdateOrInsertB" to be processed by sync tool 150 where the target operations to be invoked are to be determined based on the information of interest being synchronized.

In particular, the mapping indicates (in line 337) that the operation mapping "OpMapAB.queryI" is to be performed for pulling the information of interest based on the source criteria specified in line 338. The information of interest is then to be pushed using one of the operation mappings "OpMapAB.updateJ" and "OpMapAB.insertJ" (as indicated in line 337) based on the mapping criteria specified in line 339. The mapping criteria indicates that the selection of the operation mapping to be performed is based on whether the identifier "ContactA.Id" has a corresponding local identifier "LOCAL_ID" in the historical data, that is, whether the identifier exists in the historical data.

Thus, based on the operations specified corresponding to the operation mappings (in lines 352-358), sync tool 150 determines that the source operation "ContactAQuery" is to be performed for pulling the information of interest (with records having last update date greater than or equal to the last operation run time as indicated by the source criteria).

Sync tool 150 may then generate a SOAP request to the source web service (170A) similar to the request depicted in FIG. 6A (with the element "CreatedDate" replaced by the element "LastUpdateDate"), and therefore the description is not repeated for conciseness. Sync tool 150 may then receive a corresponding SOAP response containing the information of interest retrieved from a data store (180A) associated with a source application (165A). The description is continued assuming that the received SOAP response is similar to the SOAP response depicted in FIG. 6B.

After receiving the corresponding SOAP response, sync tool 150 determines the operation to be performed by inspecting a historical data maintained by sync tool 150. Accordingly, the description is continued describing the manner in which historical data is maintained in one embodiment.

FIG. 8 depicts a portion of a historical data indicating the information synchronized between a source application and each of multiple target applications in one embodiment. The description is continued assuming that the historical data maintains information corresponding to each "Contact" object (constituting an information packet and hereafter referred to as "record") synchronized between the source application and the target applications.

Table 800 depicts a portion of historical data indicating the specific rows that have been synchronized between the source application and the target applications. Column 821 "ID" specifies an identifier which uniquely identifies each row in table 800. Columns 822 "APP" and 823 "OBJECT" respectively specify the identifier of the mapping based on which synchronization is being performed and the object being synchronized. The values in the columns 822 and 823 correspond to the values for the names "App" and "Object" specified for the corresponding mapping in the configuration data (for example, in lines 310 and 309).

Columns 824 "APP_I_ID" and 825 "APP_J_ID" respectively specify the source and target identifiers of the record in the corresponding source and target data stores. The values in column 824 and 825 are determined based on the responses received from the web services and the unique identifiers corresponding to the source and target operations specified in the "Webservice_Defn" of the configuration data (for example, lines 388-391).

Each of rows 851-853 depicts the details of a corresponding "Contact" record synchronized between the source application and the target applications. In particular, row 851 indicates that the synchronized record having a unique identifier "151" (column 821) represents a "Contact" object (column 823) synchronized between source application "A" and a specific target application "B" (as indicated by the value "A-B" in column 821).

Row 851 further indicates that the synchronized record/object has the unique identifier "A-1" in the source data store (associated with application "A") and the unique identifier "B-1111" in the target data store (associated with application "B"). Similarly, the other rows 852-853 depict the details of other corresponding records/objects synchronized between the source application and the multiple target application.

Continuing with the above example, sync tool 150 while processing the mapping "QueryA-UpdateOrInsertB" sends a HTTP-SOAP request (similar to the request depicted in FIG. 6A) to the source web service and receives in response the HTTP-SOAP response depicted in FIG. 6B. It may be observed that the SOAP response of FIG. 6B contains two Contact objects/records (or information packets) having the respective identifiers "A-1" and "A-3" (determined based on the "outputid:" specified in line 389).

Sync tool 150 then determines whether the identifiers of the records already exist in the historical data (i.e., whether the records have been previously synchronized) based on the mapping criteria specified in the configuration data (as described above). Since the identifier "A-1" exists in the historical data, sync tool 150 performs the "ContactBUpdate" operation for the corresponding record corresponding to the operation mapping "OpMapAB.updateJ" as indicated by the "THEN" branch of the mapping criteria (in line 339).

However, for the record having the identifier "A-3" (which does not exist in the historical data indicating that the record has not been previously synchronized), sync tool 150 performs the "ContactBInsert" operation corresponding to the operation mapping "OpMapAB.insertJ" as indicated by the "ELSE" branch of the mapping criteria (in line 339).

It may be appreciated that in a scenario that a record (such as row 852) is indicated to be previously synchronized by the historical data and the information retrieved from the source web service does not contain the identifier ("A-2") of the record, sync tool 150 may determine that the record has been hard deleted in the source data store. Sync tool 150 may then be configured to invoke the "ContactBDelete" operation in such a scenario, thereby causing the corresponding record in the target data store to also be (soft or hard) deleted.

In one embodiment, sync tool 150 is configured to execute periodically to verify whether all the records present in the historical data are also present in the source data store (i.e. none of the records which exist in the historical data have been deleted from the source data store). The verification is performed by sending requests to the source web service for retrieving the records corresponding to the source identifiers maintained in the historical data (as indicated by column 824). The corresponding responses are inspected to determine the source identifiers for which corresponding records are not retrieved. Such source identifiers (for example, "A-2") are assumed to have been hard deleted in the source data store and as such, sync tool 150 invokes the "ContactBDelete" operation for each of the determined source identifiers.

Though not shown, it may be appreciated that the historical data may maintain other information (in the form of additional columns) related to the synchronization between the multiple applications. For example, the historical data may maintain the deletion status (such as "Not deleted", "Hard deleted", "Soft deleted" etc.) of each record synchronized between a source application and a target application.

Thus, different target operations may be invoked based on the information of interest being synchronized and the historical data. It may be appreciated that the performance of the appropriate target operations based on the historical data ensures that the changes made in the data is propagated to all the corresponding copies.

It may be observed that the synchronization of information between the source application and the different target applications is performed based on the schedule specified in the configuration data. However, it may be desirable that the source/target applications be provided the ability to initiate/trigger the performance of the synchronization of information.

An aspect of the present invention enables such "on-demand" synchronization to be performed in response to receiving an indication from one of the source/target applications as described below with examples.

11. Triggering Synchronization

In one embodiment, sync tool 150 provides a sync web service to facilitate triggering/initiation of the performance of a desired set of mappings specified in the configuration data. By specifying an appropriate set of mapping in a request to the sync web service, the source/target applications may perform the "on-demand" synchronization of any desired information.

FIG. 9 depicts a portion of a HTTP-SOAP request sent to a web service associated with sync tool 150 for triggering the performance of synchronization of an information of interest in one embodiment.

Lines 921-925 depict the details of the HTTP header of the request. Lines 921-925 are similar to lines 611-615 and therefore the description is not repeated for conciseness. It may be observed that the combined text of lines 922 and 921 represents the location/URL of the server system (for example, the system executing sync tool 150) hosting the sync web service.

Lines 926-938 (element "soap:envelope") depict the details of the SOAP message included in the request. In particular, lines 928-936 (element "AcmeMessage") is shown containing elements "ListOfTriggerInterface", "Trigger", "tool_operation_name", "Id" and "object" according to the data format specified in a web service definition (not shown) corresponding to the sync web service.

The value "DeleteFromB" of the element "tool_operation_name" indicates the specific mapping to be performed by sync tool 150, while the values of the elements "Id" and "object" specifies the information to the included in the HTTP-SOAP requests sent during the performance of the specific mapping. Other occurrences of the element "Trigger" may also be specified indicating corresponding mappings to be triggered/initiated.

On receiving the above SOAP request, sync tool 150 initiates performance of the operations specified in the request. Sync tool 150 may then generate a corresponding response indicating the status of performance (for example, success/failure) of the requested mappings. Thus, sync tool 150 provides "on-demand" synchronization of information of interest to source/target applications.

It may be appreciated that the synchronization of information between the source application and the different target applications is performed based on the operation mappings specified in the configuration data. In one common scenario, a user/administrator reads the web service definitions corresponding to the source and target web services, identifies the operation mappings sought to be specified, and then modifies the configuration data based on the identified operation mappings.

It may therefore be desirable that the specification of operation mappings in the configuration data be simplified. An aspect of the present invention provides a user interface enabling a user/administrator to specify the desired operation mappings as described below with examples.

12. Specifying Operation Mappings

Figure 10:
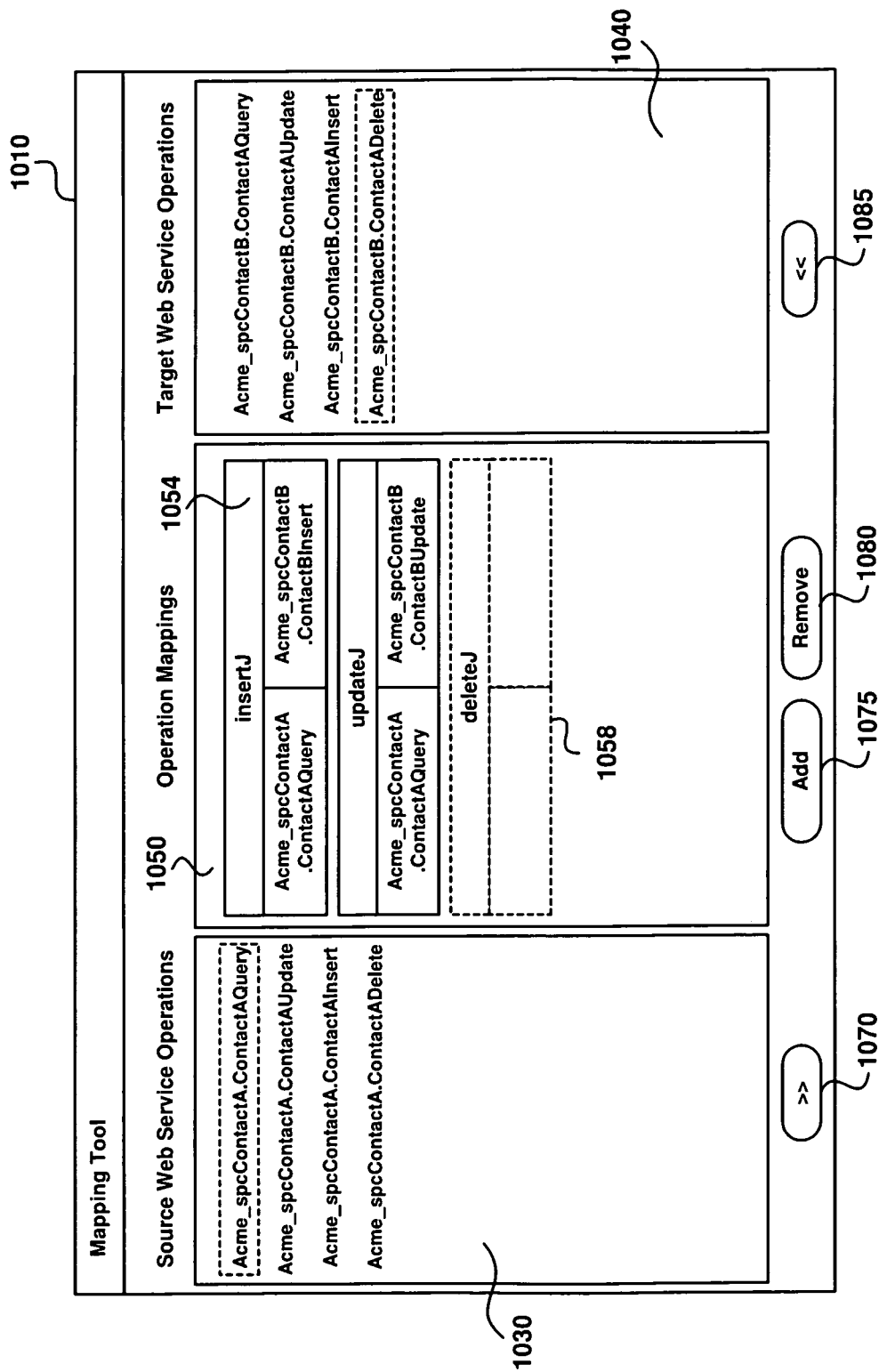
FIG. 10 depicts a user interface using which a user/administrator may specify the operations to be invoked in source and target web services for performing synchronization of information in one embodiment.

FIG. 10 depicts a user interface using which a user/administrator may specify the operations to be invoked in source and target web services (for example, web services 170A and 170B of FIG. 1 respectively) for performing synchronization of information in one embodiment.

Display area 1010 (titled "Mapping Tool") represents a portion of a screen displayed in response to a request from a user/administrator desiring to specify operation mappings in the configuration data. Display area 1010 may be displayed on a display unit associated with the requesting system (such as one of client systems 110A-110B).

List box 1030 specifies the operations provided by a source web service (170A) while list box 1040 specifies the operations provided by a target web service (170B). It may be observed that the operations indicated in list boxes 1030 and 1040 correspond to the operations specified by the respective source and target web service definitions depicted in FIGS. 4 and 5.

Button 1070 (labeled ">>") enables a user to indicate that the operation selected in list box 1030 (shown in a dotted box) is to be used as the source operation, while button 1085 (labeled "<<") enables a user to indicate that the selected operation in list box 1040 is to be used as the target/destination operation.

Display area 1050 specifies the operation mappings specified between the source and target web services. Button 1075 (labeled "Add") enables a user to add a new operation mapping to the configuration data, while button 1080 (labeled "Remove") enables a used to remove an existing operation mapping from the configuration data.

Each operation mapping in display area 1050 is displayed in the form of a box divided horizontally into two, with the top half indicating the name of the operation mapping. The bottom half is further divided vertically into two, with the left portion indicating the source operation and the right portion indicating the target/destination operation corresponding to the operation mapping.

Accordingly, mapping 1054 specifies an operation mapping named "insertJ" between the source operation "Acme_spcContactA.ContactAQuery" and the target/destination operation "Acme_spcContactB.ContactBInsert".

Mapping 1058 indicates a new operation mapping named "deleteJ" whose source and destination operation are yet to be specified. As such, a user/administrator may click/select button 1070 to specify the operation "Acme_spcContactA.ContactAQuery" selected in list box 1030 as the source operation corresponding to mapping 1058. Similarly, the user/administrator may click/select button 1085 to specify the operation "Acme_spcContactB.ContactBDelete" as the destination operation for mapping 1058.

Thus, a user/administrator may specify the operations to be invoked in source and target web services for performing synchronization of information. The operations specified by the user/administrator may be stored in the form of operation mappings in the configuration data (for example, lines 355-358 of FIG. 3).

Similar interfaces (not shown) may be provided to enable the user/administrator to specify/configure other aspects of the sync tool configuration data, e.g. specifying jobs, time schedules, WSDL Type/Field mapping, etc.

It may be appreciated that the features of the present invention are described above with respect to a source application and a single target application (as indicated by the mappings in the configuration data) merely for illustration. However the approaches can be extended for any desired combination of source and target applications with the configuration data indicating mappings between two or more applications, without departing from the scope and spirit of the present invention, as will be apparent to one skilled in the relevant arts.

It should be further appreciated that the features described above can be implemented in various embodiments as a desired combination of one or more of hardware, software, and firmware. The description is continued with respect to an embodiment in which various features are operative when software instructions are executed.

13. Digital Processing System

Figure 11:
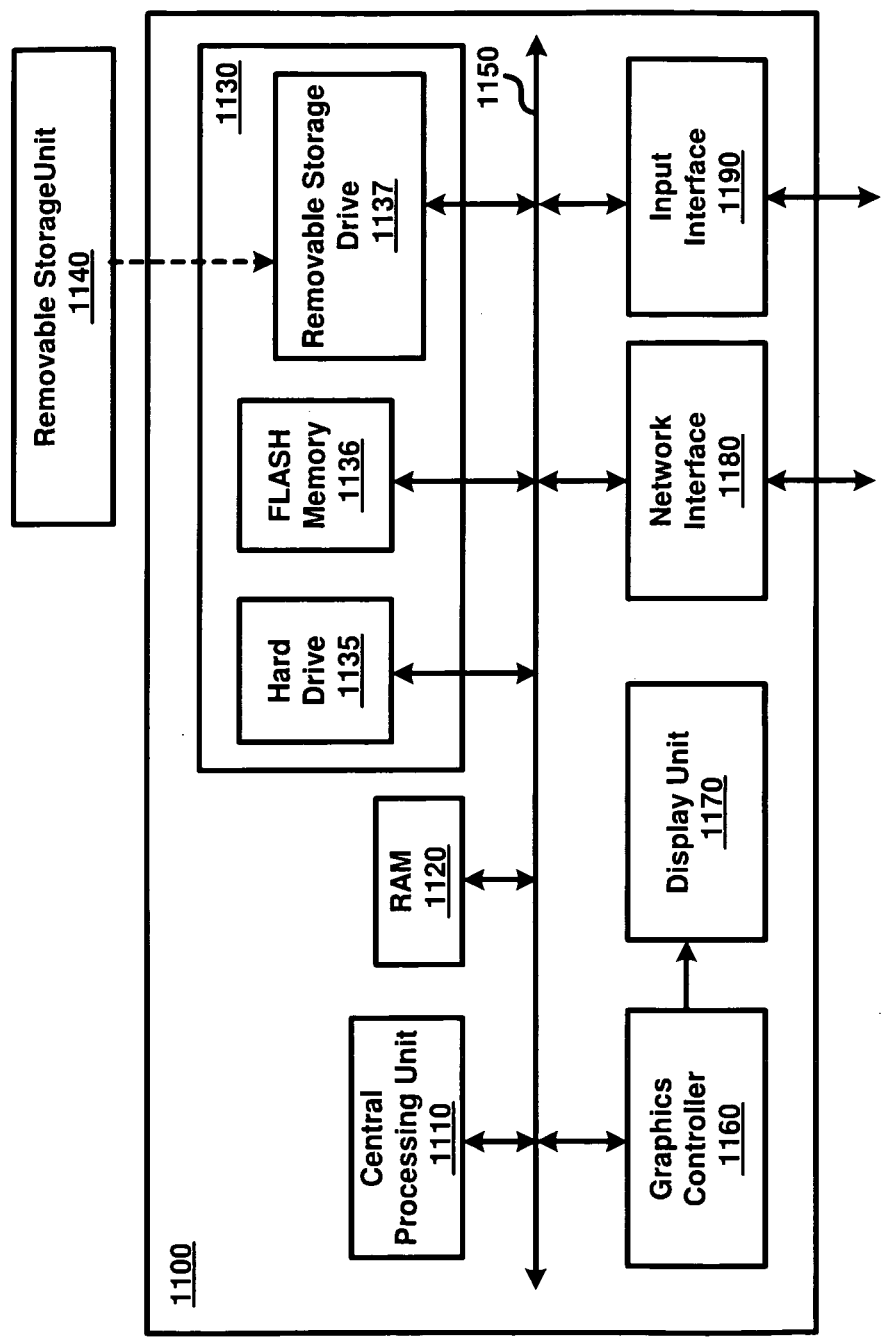
FIG. 11 is a block diagram illustrating the details of a digital processing system in which various aspects of the present invention are operative by execution of appropriate software instructions.

FIG. 11 is a block diagram illustrating the details of digital processing system 1100 in which various aspects of the present invention are operative by execution of appropriate software instructions. Digital processing system 1100 may correspond to a system executing sync tool 150.

Digital processing system 1100 may contain one or more processors (such as a central processing unit (CPU) 1110), random access memory (RAM) 1120, secondary memory 1130, graphics controller 1150, display unit 1170, network interface 1180, and input interface 1190. All the components except display unit 1170 may communicate with each other over communication path 1150, which may contain several buses as is well known in the relevant arts. The components of FIG. 11 are described below in further detail.

CPU 1110 may execute instructions stored in RAM 1120 to provide several features of the present invention. CPU 1110 may contain multiple processing units, with each processing unit potentially being designed for a specific task. Alternatively, CPU 1110 may contain only a single general-purpose processing unit. RAM 1120 may receive instructions from secondary memory 1130 using communication path 1150.

Graphics controller 1150 generates display signals (e.g., in RGB format) to display unit 1170 based on data/instructions received from CPU 1110. Display unit 1170 contains a display screen to display the images defined by the display signals (e.g., the interface of FIG. 10). Input interface 1190 may correspond to a keyboard and a pointing device (e.g., touch-pad, mouse).

Network interface 1180 provides connectivity to a network (e.g., using Internet Protocol), and may be used to communicate (e.g., to send/receive portions of data depicted in FIGS. 6A-6B, 7A-7B and 9) with other connected systems (such as client systems 110A-110B or server systems 160A-160C) of FIG. 1.

Secondary memory 1130 may contain hard drive 1135, flash memory 1135, and removable storage drive 1137. Secondary memory 1130 may store the data (e.g., portions of data depicted in FIGS. 3A-3C, 4A-4B, 5A-5B and 8) and software instructions, which enable digital processing system 1100 to provide several features in accordance with the present invention.

Some or all of the data and instructions may be provided on removable storage unit 1140, and the data and instructions may be read and provided by removable storage drive 1137 to CPU 1110. Floppy drive, magnetic tape drive, CD-ROM drive, DVD Drive, Flash memory, removable memory chip (PCMCIA Card, EPROM) are examples of such removable storage drive 1137.

Removable storage unit 1140 may be implemented using medium and storage format compatible with removable storage drive 1137 such that removable storage drive 1137 can read the data and instructions. Thus, removable storage unit 1140 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1140 or hard disk installed in hard drive 1135. These computer program products are means for providing software to digital processing system 1100. CPU 1110 may retrieve the software instructions, and execute the instructions to provide various features of the present invention described above.

14. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of simplifying synchronization of information between a source application and a plurality of target applications, said method being performed by a sync tool provided external to said source application and said plurality of target applications, said method comprising:

maintaining a configuration data specifying a plurality of mappings, each mapping indicating that information is to be synchronized between said source application and one of said plurality of target applications;

selecting, by said sync tool, a first mapping indicating that information is to be synchronized between said source application and said first target application, wherein said first mapping is contained in said plurality of mappings, said first mapping further indicating a criteria qualifying said information to be synchronized, wherein said criteria qualifies a plurality of data items of said source application are to be synchronized with said first target application;

pulling from said sync tool, said plurality of data items using a first web service designed to retrieve said plurality of data items from a first data store associated with said source application, wherein said pulling comprises sending a request to said first web service for invoking a first operation provided by said first web service and receiving a response from said first web service containing said plurality of data items, whereby said pulling causes said plurality of data items to be received by said sync tool, wherein said request and said response are according to respective formats specified by a first web service definition according to Web Service Definition Language (WSDL), wherein said first web service definition is capable of being retrieved as a corresponding WSDL file from said first web service, wherein said first web service definition further specifies an identifier of said first operation, wherein said first operation is invoked by including said identifier in said request to said first web service; and pushing, from said sync tool, said plurality of data items using a second web service designed to store said plurality of data items in a second data store associated with a first target application contained in said plurality of target applications, wherein said pushing comprises invoking a second operation provided by said second service designed to store data in said second data store, wherein said pushing causes said plurality of data items, retrieved by said sync tool, to be stored in said second data store, wherein said invoking of said second operation is according to a format specified by a second web service definition according to WSDL, wherein said second web service definition is capable of being retrieved as a corresponding WSDL file from said second web service, wherein said second web service definition further specifies an identifier of said second operation, wherein said second operation is invoked by including said identifier of said second operation in a request to said second web service, wherein said pulling and said pushing are performed from said sync tool for each of said plurality of data items in response to said selecting of said first mapping from said configuration data, wherein said sync tool is implemented based on at least one processor executing a set of instructions retrieved from a memory.

2. The method of claim 1, wherein each web service is designed to provide a corresponding set of operations, which on invocation performs the actions of said pulling and said pushing of information, wherein each of said plurality of mappings further indicates the specific operations to be invoked in corresponding web services for performing synchronization of information between said source application and said plurality of target applications, wherein said first mapping further indicates that said first operation provided by said first web service is to be invoked for said pulling of said plurality of data items and that said second operation provided by said second web service is to be invoked for said pushing of said plurality of data items, wherein said pulling pulls said plurality of data items by invoking said first operation in said first web service and said pushing pushes said plurality of data items by invoking said second operation in said second web service based on examination of said first mapping, wherein invoking of said first operation comprises sending a first location/URL of the first web service and said identifier of said first operation provided by the first web service.

3. The method of claim 2, wherein said selecting selects a second mapping indicating that information is to be synchronized between said source application and a second target application contained in said plurality of target applications, wherein said second mapping is contained in said plurality of mappings, wherein said second mapping further indicates that a third operation provided by said first web service is to be invoked for said pulling of said plurality of data items and that a fourth operation provided by a third web service is to be invoked for said pushing of said plurality of data items, wherein said third web service is designed to store said plurality of data items in a third data store associated with said second target application, wherein said pulling pulls said plurality of data items by invoking said third operation and said pushing pushes said plurality of data items by invoking said fourth operation after said selecting said second mapping, wherein said first mapping and said second mapping are provided in the form of configuration data external to said sync tool.

4. The method of claim 3, wherein said first mapping further specifies a first schedule according to which information is to be synchronized between said source application and said first target application, wherein said second mapping further specifies a second schedule according to which information is to be synchronized between said source application and said second target application, wherein said sync tool performs said pulling and said pushing for said first mapping according to said first schedule, wherein said sync tool performs said pulling and said pushing for said second mapping according to said second schedule.

5. The method of claim 2, wherein said pulling comprises:

sending said request to said first web service for invoking said first operation, wherein said request is according to an input format specified by said first web service definition; and receiving said response to said request from said first web service, wherein said response contains said plurality of data items according to an output format specified by said first web service definition, wherein said plurality of data items is retrieved from said first data store by a software code corresponding to said first operation executing in a first system.

6. The method of claim 5, further comprising:

converting said plurality of data items from said output format to another input format specified by said second web service definition, wherein said pushing comprises:

sending another request to said second web service for invoking said second operation, wherein said another request contains said plurality of data items according to said another input format, wherein said plurality of data items is stored in said second data store by a software code corresponding to said second operation executing in a second system.

7. The method of claim 6, wherein said request, said response and said another request are encoded in the form of Simple Object Access Protocol (SOAP) packets.

8. The method of claim 7, wherein said configuration data specifies a resource at which said first web service is provided, said method further comprising:

retrieving said first web service definition from said resource by sending a request to said resource, wherein said pulling from said first web service is performed according to the retrieved first web service definition.

9. The method of claim 3, wherein said first mapping further indicates that one of a second set of operations provided by said second web service is to be invoked for said pushing of said plurality of data items, said second operation being contained in said second set of operations, said method further comprising:

maintaining a historical data indicating the information synchronized between said source application and each of said plurality of target applications; and determining the specific one of said second set of operations to be invoked based on said historical data and said plurality of data items, wherein said pushing pushes said plurality of data items using the determined specific one of said second set of operations.

10. The method of claim 9, wherein said second set of operations contains an insert operation and an update operation designed respectively for inserting and updating a first information packet in said second data store, said first information packet being contained in said plurality of data items, wherein said determining determines that said insert operation is to be invoked if said historical data indicates that said first information packet is not previously synchronized between said source application and said first target application, and that said update operation is to be invoked otherwise.

11. The method of claim 10, wherein said second set of operations contains a delete operation designed for deleting a second information packet contained in said second data store, wherein said determining determines that said delete operation is to be invoked if said second information packet is not contained in said plurality of data items and said historical data indicates that said second information packet is previously synchronized between said source application and said first target application.

12. The method of claim 11, wherein said determining determines that said delete operation is to be invoked if said second information packet is indicated to be deleted by said plurality of data items.

13. The method of claim 1, further comprising receiving an indication indicating that synchronization between said source application and said first target application is to be performed, wherein said pulling and said pushing are performed in response to said receiving said indication.

14. The method of claim 13, wherein said receiving receives said indication from one of said source application and said first target application as a request to a fourth web service provided by said sync tool.

15. The method of claim 3, further comprising:
provided a user interface to indicate the specific operations to be invoked in corresponding web services for performing synchronization of information between said source application and said plurality of target applications,
wherein a user uses said user interface to indicate that said first operation provided by said first web service is to be invoked for said pulling of said plurality of data items and that said second operation provided by said second web service is to be invoked for said pushing of said plurality of data items.

16. A non-transitory machine readable medium storing one or more sequences of instructions for causing a system to simplify synchronization of information between a source application and a plurality of target applications, wherein execution of said one or more sequences of instructions by one or more processors contained in said system causes said system to perform the actions of:
determining a first set of operations provided by a first web service and a second set of operations provided by a second web service, wherein a first subset of said first set of operations is designed to retrieve information from a first data store associated with said source application, wherein a second subset of said second set of operation is designed to store information in a second data store associated with a first target application of said plurality of target applications,
wherein said determining determines said first set of operations based on a first web service definition capable of being retrieved from said first web service, and said second set of operations based on a second web service definition capable of being retrieved from said second web service; and
enabling a user to specify a first pair of operations, wherein a first operation of said first pair is contained in said first subset, and a second operation of said first pair is contained in said second subset,
wherein a sync tool, based on said user having specified said first pair of operations, is operable to pull an information of interest by invoking said first operation of said first web service, and push said information of interest by invoking said second operation of second web service to store said information of interest in said second data store.

17. The non-transitory machine readable medium of claim 16, wherein said first web service definition and said second web service definition are according to Web Service Definition Language (WSDL),
wherein said first web service definition and said second web service definition are capable of being retrieved as corresponding WSDL files from said first web service and said second web service respectively.

18. The non-transitory machine readable medium of claim 17, wherein said enabling comprises:
providing a user interface to indicate the specific operations to be invoked in corresponding web services for performing synchronization of information between said source application and said plurality of target applications, wherein said user interface displays said first set of operations and said second set of operations,
wherein a user uses said user interface to specify said first pair of operations based on said display.

19. The non-transitory machine readable medium of claim 18, further comprising one or more instructions for:
maintaining a configuration data specifying a plurality of mappings, each mapping indicating that information is to be synchronized between said source application and one of said plurality of target applications, wherein a first mapping of said plurality of mappings indicates that information is to be synchronized between said source application and said first target application,
said maintaining further including along with said first mapping in said configuration data said first pair of operations, in response to said enabling; and
selecting initially said first mapping indicating that information is to be synchronized between said source application and said first target application,
wherein said sync tool is operable to perform said pulling and said pushing after said selecting said first mapping.

20. The non-transitory machine readable medium of claim 19, wherein said first mapping further indicates that said second subset of said second set of operations provided by said second web service can be invoked for said pushing of said information of interest to said first target application, further comprising one or more instructions for:
maintaining a historical data indicating the information synchronized between said source application and each of said plurality of target applications including said first target application; and
determining the specific one of said second subset of said second set of operations to be invoked based on said historical data for said first target application and said information of interest,
wherein said sync tool pushes said information of interest to said first target application by invoking the determined specific one of said second subset of said second set of operations.

21. The non-transitory machine readable medium of claim 20, wherein said second subset of said second set of operations contains an insert operation and an update operation designed respectively for inserting and updating a first information packet in said second data store, said first information packet being contained in said information of interest,
wherein said determining determines that said insert operation is to be invoked if said historical data indicates that said first information packet is not previously synchronized between said source application and said first target application, and that said update operation is to be invoked otherwise.

22. The non-transitory machine readable medium of claim 21, wherein said second subset of said second set of operations contains a delete operation designed for deleting a second information packet contained in said second data store,
wherein said determining determines that said delete operation is to be invoked if said second information packet is not contained in said information of interest and said historical data indicates that said second information packet is previously synchronized between said source application and said first target application.

23. A computing system comprising:
a plurality of data stores comprising corresponding non-volatile storage to store respective copies of a data, said plurality of data stores including a first data store and a second data store;
a plurality of systems to execute a plurality of applications, wherein each of said plurality of applications is designed to operate with the copy of said data maintained in one of said plurality of data stores, wherein a first application and a second application of said plurality of applications is designed to operate with respective copies of data maintained in said first data store and said second data store; and
a sync tool provided external to said plurality of applications to synchronize the copies of said data, said sync tool being operable to:
determine a first set of operations provided by a first web service and a second set of operations provided by a second web service, wherein a first subset of said first set of operations is designed to retrieve information from said first data store, wherein a second subset of said second set of operation is designed to store information in said second data store,
wherein said sync tool determines said first set of operations based on a first web service definition capable of being retrieved from said first web service, and said second set of operations based on a second web service definition capable of being retrieved from said second web service;
enable a user to specify a first pair of operations, wherein a first operation of said first pair is contained in said first subset, and a second operation of said first pair is contained in said second subset;
pull an information of interest contained in said data by invoking said first operation of said first web service; and
push said information of interest by invoking said second operation of said second web service to store said information of interest in said second data store,
wherein at least one of said sync tool and said plurality of systems contains a processor and a memory, said processor to retrieve instructions from said memory and to execute the retrieved instructions.

24. The computing system of claim 23, further comprising:
a local database associated with said sync tool to maintain a configuration data specifying a plurality of mappings, each mapping indicating that information is to be synchronized between said plurality of applications, wherein a first mapping of said plurality of mappings indicates that information is to be synchronized between said first application and said second application,
said sync tool further including along with said first mapping in said configuration data said first pair of operations, in response to said enabling,
wherein said sync tool initially selects said first mapping indicating that information is to be synchronized between said first application and said second application
wherein said sync tool then pulls and pushes said information of interest in response to selecting said first mapping.

* * * * *

UNITED STATES PATENT AND TRADEMARK OFFICE
CERTIFICATE OF CORRECTION

PATENT NO. : 8,572,161 B2  
APPLICATION NO. : 12/046504  
DATED : October 29, 2013  
INVENTOR(S) : Gill Page 1 of 1

It is certified that error appears in the above-identified patent and that said Letters Patent is hereby corrected as shown below:

In the Specification

In column 8, line 36, delete "that that" and insert -- that --, therefor.

In column 12, line 6, delete "that that" and insert -- that --, therefor.

In column 14, line 28, delete "that that" and insert -- that --, therefor.

In the Claims

In column 26, line 32, in Claim 9, delete "claim 3," and insert -- claim 2, --, therefor.

In column 27, line 15, in Claim 15, delete "claim 3," and insert -- claim 2, --, therefor.

Signed and Sealed this  
Twenty-fourth Day of June, 2014

Michelle K. Lee  
*Deputy Director of the United States Patent and Trademark Office*